(12) United States Patent
Stahl et al.

(10) Patent No.: US 12,441,991 B2
(45) Date of Patent: Oct. 14, 2025

(54) METHOD OF PURIFYING BOTULINUM TOXIN

(71) Applicants: GALDERMA HOLDING SA, Zug (CH); IPSEN BIOPHARM LIMITED, Wrexham (GB)

(72) Inventors: Ulf Stahl, Uppsala (SE); Peter Frank, Uppsala (SE); Anders Jarstad, Uppsala (SE); Sebastiaan Mul, Uppsala (SE); John Nolin, Storvreta (SE); Lena Nodqvist, Uppsala (SE); Simon Aberg, Uppsala (SE)

(73) Assignee: Galderma Holding SA, Zug (CH)

( * ) Notice: Subject to any disclaimer, the term of this patent is extended or adjusted under 35 U.S.C. 154(b) by 472 days.

(21) Appl. No.: 17/757,734

(22) PCT Filed: Dec. 19, 2020

(86) PCT No.: PCT/IB2020/062249
§ 371 (c)(1),
(2) Date: Jun. 20, 2022

(87) PCT Pub. No.: WO2021/124295
PCT Pub. Date: Jun. 24, 2021

(65) Prior Publication Data
US 2023/0029456 A1 Feb. 2, 2023

Related U.S. Application Data

(60) Provisional application No. 62/951,828, filed on Dec. 20, 2019.

(51) Int. Cl.
*C12N 9/52* (2006.01)
*A61K 38/48* (2006.01)
*C07K 1/18* (2006.01)
*C07K 1/34* (2006.01)

(52) U.S. Cl.
CPC ........ *C12N 9/52* (2013.01); *C12Y 304/24069* (2013.01)

(58) Field of Classification Search
None
See application file for complete search history.

(56) References Cited

U.S. PATENT DOCUMENTS 7,452,697 B2 * 11/2008 Luo ..................... C12N 9/6489
435/71.1
2011/0008843 A1 1/2011 Ton et al.

FOREIGN PATENT DOCUMENTS

JP 2011074025 A 4/2011
WO WO-2018065972 A1 * 4/2018 ........... B01D 15/362

OTHER PUBLICATIONS

"Strategies for Protein Purification Handbook," GE Healthcare, Sep. 2010 (Year: 2010).*
Byrne et al., Infection and Immunity 66:4817-4822, 1998 (Year: 1998).*
Gessler et al., Journal of Biotechnology, 119:204-211 (2005).
Malizio et al., Methods in Molecular Biology, 145:27-39 (2000).
Sundberg et al., Toxicon, 190:S70 (2020).

* cited by examiner

*Primary Examiner* — David Steadman
(74) *Attorney, Agent, or Firm* — Sunit Talapatra; Foley & Lardner LLP

(57) ABSTRACT

The present technology relates to commercial-scale methods for purifying botulinum toxin compositions obtained from cell cultures. Purification methods according to the present disclosure are based on a series of filtration and chromatographic separation steps that produce a high-purity botulinum toxin composition, which comprises botulinum toxin protein molecules (~150 kDa) in solution, which is free, essentially free, or substantially free of botulinum toxin complexes and animal products, and without precipitating or lyophilizing botulinum toxin protein molecules. The purification method according to the present disclosure uses no precipitation, lyophilization, or centrifugation steps, permitting production of highly pure, highly active, free botulinum toxin protein molecules (~150 kDa) in solution, without the need for reconstitution by the end user.

14 Claims, 8 Drawing Sheets

100 →

104 Obtain Fermentation Medium

106 First Filtration

107 Toxin-Containing Permeate

108 Second Filtration

110 Clarified Culture

112 First Chromatographic Separation

114 Toxin-Containing Fraction

116 Second Chromatographic Separation

118 First Toxin-Containing Eluant

120 Third Filtration

121 Toxin-Containing Retentate

124 Third Chromatographic Separation

126 Second Toxin-Containing Eluant

128 Fourth Chromatographic Separation

130 Third Toxin-Containing Eluant

132 Dilution, Filtration & Dispensing

134 Product Toxin Solution

METHOD OF PURIFYING BOTULINUM TOXIN

CROSS-REFERENCE TO RELATED APPLICATIONS

This application claims priority under 35 U.S.C. § 119(e) to U.S. Provisional Application No. 62/951,828, filed Dec. 20, 2019, which is hereby incorporated by reference in its entirety.

FIELD

The present technology relates generally to the field of purifying neurotoxin protein molecules. In particular, the present technology relates to a method for purifying a botulinum toxin. The botulinum toxin purified therefrom are suitable for use in therapy and in particular for administration to a patient to achieve a desired therapeutic or aesthetic effect.

BACKGROUND

The following description of the background of the present technology is provided simply as an aid in understanding the present technology and is not admitted to describe or constitute prior art to the present technology.

Seven generally immunologically distinct botulinum neurotoxins have been characterized—botulinum neurotoxin serotypes A, B, C, D, E, F, and G—each of which is distinguished by neutralization with type-specific antibodies. As one example, BOTOX® is the trademark of a botulinum toxin type A purified neurotoxin complex available commercially from Allergan, Inc. (Irvine, California). BOTOX® is a popular injection-based cosmetic treatment that temporarily reduces the appearance of fine lines and wrinkles.

Botulinum toxins, including the type-A toxins, are conventionally produced from C. botulinum fermentation, which may yield a culture solution containing whole bacteria, lysed bacteria, culture media nutrients, and fermentation by-products, in addition to botulinum toxin molecules. Filtering C. botulinum culture solutions to remove whole and/or lysed cellular components, and optionally other fermentation medium residues, yields a clarified culture. The clarified culture solution contains botulinum toxin molecules and various impurities that can be removed to obtain concentrated, purified botulinum toxin (e.g., BoNT/A1), suitable for compounding into a botulinum toxin pharmaceutical composition.

Existing commercial-scale processes for obtaining pharmaceutically-suitable botulinum toxin compositions typically use multiple precipitation steps to separate the toxin complex from residual impurities from the fermentation process. For example, cold alcohol fractionation (e.g., Cohn's method) or precipitation is used to remove plasma proteins. Unfortunately, precipitation techniques for purifying a botulinum toxin suffer from low resolution, low yield, operational difficulty, control and/or validation difficulties, and lack of scalability. Additionally, drying botulinum toxin (e.g., by lyophilization, precipitation, etc.) substantially reduces its toxicity. This is a clinical concern because inactivated toxin may form a toxoid and immunize patients against botulinum toxin.

Nonetheless, botulinum toxin products currently approved in the U.S. (e.g., BOTOX COSMETIC®, DYSPORT®, XEOMIN® and JEUVEAU®) are stored in lyophilized or freeze-dried form for stability reasons. Such formulations need to be reconstituted by the physician in a sterile saline solution before administration to the patient. This reconstitution step is associated with a loss of physician time, a risk of dilution error, and a risk of contamination. The botulinum toxin provider must also train the physicians in order to ensure that the reconstitution step is performed adequately.

Therefore, controllable, scalable, high-yield methods are needed for purifying botulinum toxins from fermentation media to obtain high-purity, highly-active, pharmaceutically-suitable botulinum toxin compositions, in a form that is free, essentially free, or substantially free of animal products and which does not require reconstitution before administration to patients.

SUMMARY OF THE TECHNOLOGY

In one aspect, the present disclosure relates to a method for purifying a botulinum toxin, comprising purifying the toxin from a solution comprising the toxin, wherein the process does not comprise precipitation, centrifugation or lyophilization.

In some embodiments, the botulinum toxin is serotype A. In some embodiments, the purified botulinum toxin obtained is free, essentially free, or substantially free of botulinum toxin complexes. In some embodiments, the purified botulinum toxin obtained is free, essentially free, or substantially free of animal products, including human albumin.

In some embodiments, the purifying comprises a filtering step, preferably a tangential flow filtration step. In some embodiments, the filtering step uses a hollow fiber filter. In some embodiments, the purifying comprises contacting a first chromatography column with a solution comprising the toxin to produce a toxin-containing fraction. In some embodiments, the first chromatography column comprises an anion exchange chromatography column. In some embodiments, the anion exchange chromatography column comprises Q Sepharose. In some embodiments, the purifying further comprises collecting the toxin-containing fraction, wherein the toxin-containing fraction does not adsorb to the first stationary phase.

In some embodiments, the purifying further comprises contacting a second chromatography column with the toxin-containing fraction. In some embodiments, the second chromatography column comprises a cation exchange chromatography column. In some embodiments, the cation exchange chromatography column comprises SP Sepharose. In some embodiments, the purifying further comprises eluting the botulinum toxin from the second chromatography column to produce a first toxin-containing eluant.

In some embodiments, the purifying further comprises filtering the first toxin-containing eluant to produce a toxin-containing retentate. In some embodiments, filtering the first toxin-containing eluant comprises a buffer exchange. In some embodiments, filtering the first toxin-containing eluant separates botulinum toxin molecules from non-toxin proteins to produce free toxin molecules.

In some embodiments, the purifying further comprises contacting a third chromatography column with the toxin-containing retentate. In some embodiments, the third chromatography column comprises a second anion exchange chromatography column. In some embodiments, the second anion exchange chromatography column comprises Q Sepharose. In some embodiments, the purifying further comprises eluting the botulinum toxin from the third chromatography column to produce a second toxin-containing eluant.

In some embodiments, the purifying further comprises contacting a fourth chromatography column with the second toxin-containing eluant. In some embodiments, the toxin-containing eluant is directly injected onto the fourth chromatography column. In some embodiments, the third chromatography column and the fourth chromatography column are interconnected.

In some embodiments, the fourth chromatography column comprises a size exclusion chromatography column. In some embodiments, the size exclusion chromatography column comprises a gel filtration chromatography column. In some embodiments, the gel filtration chromatography column comprises Superdex 200. In some embodiments, the purifying further comprises eluting the botulinum toxin from the fourth chromatography column to produce a purified botulinum toxin.

In another aspect, a method for purifying a botulinum toxin from a solution comprising the toxin comprises: (a) filtering the solution comprising the toxin; (b) contacting a first chromatography column with the filtered solution comprising the toxin from (a), wherein the first chromatography column is an ion exchange chromatography column; (c) collecting a toxin-containing fraction, wherein the toxin-containing fraction flows through the first chromatography column without adsorbing to the stationary phase; (d) contacting a second chromatography column with the toxin-containing fraction, wherein the second chromatography column is an ion exchange chromatography column; (e) eluting the botulinum toxin from the second chromatography column to produce a first toxin-containing eluant; (f) filtering the first toxin-containing eluant to produce a toxin-containing retentate; (g) contacting a third chromatography column with the toxin-containing retentate from the filtering (f), wherein the third chromatography column is an ion exchange column; (h) eluting the botulinum toxin from the third chromatography column to produce a second toxin-containing eluant; (i) contacting a fourth chromatography column with the second toxin-containing eluant, wherein said fourth chromatography column is a size exclusion chromatography column; and (j) eluting the botulinum toxin from the fourth chromatography column, thereby producing a purified botulinum toxin, wherein the process does not comprise precipitating, centrifugation or lyophilizing the botulinum toxin.

In some embodiments, the botulinum toxin comprises botulinum neurotoxin serotype A. In some embodiments, the purified botulinum toxin obtained is free, essentially free, or substantially free of botulinum toxin complexes. In some embodiments, the purified botulinum toxin obtained is free, essentially free, or substantially free of animal products, including human albumin.

In some embodiments, the first chromatography column comprises an anion exchange chromatography column. In some embodiments, the first chromatography column comprises Q Sepharose.

In some embodiments, the second chromatography column comprises a cation exchange chromatography column. In some embodiments, the second chromatography column comprises SP Sepharose.

In some embodiments, the first chromatography column comprises an anion exchange chromatography column and the second chromatography column comprises a cation exchange chromatography column. In some embodiments, the first chromatography column comprises Q Sepharose and the second chromatography column comprises SP Sepharose.

In some embodiments, the third chromatography column comprises an anion exchange chromatography column. In some embodiments, the third chromatography column comprises Q Sepharose.

In some embodiments, the fourth chromatography column comprises a gel filtration column. In some embodiments, the fourth chromatography column comprises Superdex 200.

In some embodiments, the third chromatography column comprises an anion exchange chromatography column and the fourth chromatography column comprises a gel filtration chromatography column. In some embodiments, the third chromatography column comprises Q Sepharose and the fourth chromatography column comprises Superdex 200. In some embodiments, the second toxin-containing eluant is directly injected onto the fourth chromatography column. In some embodiments, the third chromatography column and the fourth chromatography column are interconnected.

In some embodiments, the first chromatography column is an anion exchange chromatography column, the second chromatography column is a cation exchange chromatography column, the third chromatography column is a second anion exchange chromatography column, and the fourth chromatography column is a gel filtration chromatography column. In an embodiment, the first chromatography column comprises Q Sepharose, the second chromatography column comprises SP Sepharose, the third chromatography column comprises Q Sepharose, and the fourth chromatography column comprises Superdex 200.

In some embodiments, the first, second, third, and fourth chromatography columns are single-use chromatography systems.

In some embodiments, the filtering (f) dissociates botulinum toxin protein molecules from non-toxin proteins to produce free toxin molecules. In some embodiments, the filtering (f) comprises a buffer exchange.

In some embodiments, the solution comprising botulinum toxin is free, essentially free, or substantially free of animal products. In some embodiments, the purifying comprises contacting the botulinum toxin with a buffer solution, wherein the buffer solution has been filtered to reduce bioburden.

In another aspect, the present disclosure relates to a purified botulinum toxin produced by purifying the toxin from a solution comprising the toxin, wherein the process does not comprise precipitation, centrifugation or lyophilization. In some embodiments, the purified botulinum toxin is serotype A. In some embodiments, the purified botulinum toxin is free, essentially free, or substantially free of toxin complexes. In some embodiments, the purified botulinum toxin is free, essentially free, or substantially free of animal products, including human albumin.

In another aspect, the present disclosure relates to a composition comprising purified botulinum toxin in a buffer solution comprising phosphate. In some embodiments, the buffer solution further comprises acetate. In some embodiments, the buffer solution further comprises at least one source of chloride ions. In some embodiments, the at least one source of chloride ions comprises sodium chloride. In some embodiments, the buffer solution further comprises at least one surfactant. In some embodiments, the surfactant is polysorbate 20.

In some embodiments of the composition according to the present disclosure, the botulinum toxin is botulinum neurotoxin serotype A. In some embodiments, the composition is free, essentially free, or substantially free of botulinum toxin complexes. In some embodiments, the composition is free, essentially free, or substantially free of animal products. In some embodiments, the composition is free, essentially free, or substantially free of human albumin. In some embodiments, the composition has a pH of between about 6.6 and 6.9.

The following detailed description is exemplary and explanatory, but it is not intended to be limiting.

BRIEF DESCRIPTION OF THE DRAWINGS

FIG. 1 is flow chart showing one embodiment of the method for purifying a botulinum toxin composition from a fermentation medium according to the present disclosure.

FIG. 2 shows SDS-PAGE results using Colloidal Coomassie Blue staining for a product toxin solution prepared according to the present disclosure.

DETAILED DESCRIPTION

Figure 3:
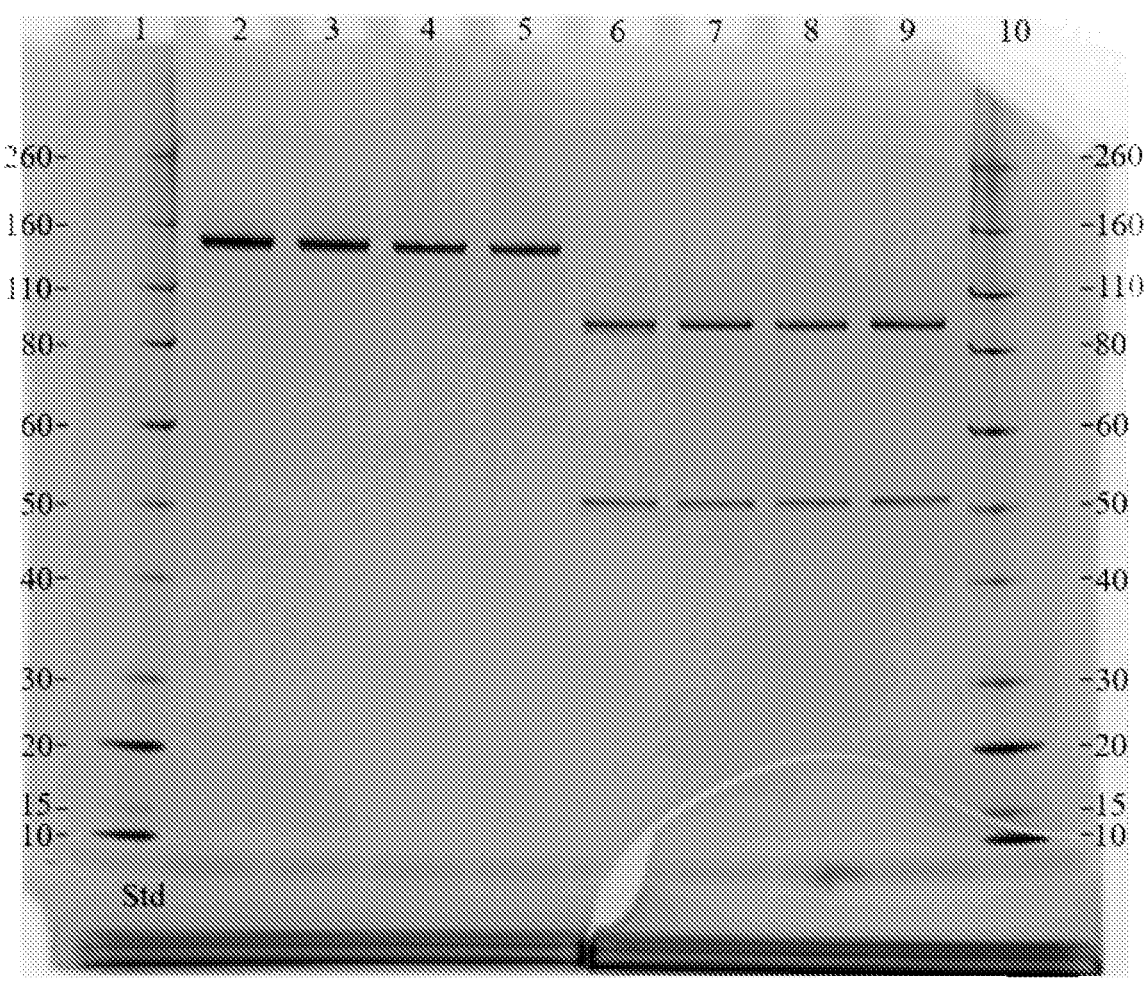
FIG. 3 shows SDS-PAGE results for three different product toxin solutions prepared according to the present disclosure.

Embodiments according to the present disclosure will be described more fully hereinafter. Aspects of the disclosure may, however, be embodied in different forms and should not be construed as limited to the embodiments set forth herein. Rather, these embodiments are provided so that this disclosure will be thorough and complete, and will fully convey the scope of the technology to those skilled in the art. It is to be understood that this present technology is not limited to particular methods, reagents, compounds compositions or biological systems, which can, of course, vary. The terminology used in the description herein is for the purpose of describing particular embodiments only and is not intended to be limiting.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the present application and relevant art and should not be interpreted in an idealized or overly formal sense unless expressly so defined herein. While not explicitly defined below, such terms should be interpreted according to their common meaning.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Unless the context indicates otherwise, it is specifically intended that the various features of the invention described herein can be used in any combination. Moreover, the disclosure also contemplates that in some embodiments, any feature or combination of features set forth herein can be excluded or omitted. To illustrate, if the specification states that a complex comprises components A, B and C, it is specifically intended that any of A, B or C, or a combination thereof, can be omitted and disclaimed singularly or in any combination.

Unless explicitly indicated otherwise, all specified embodiments, features, and terms intend to include both the recited embodiment, feature, or term and biological equivalents thereof.

All patents, patent applications, provisional applications, and publications referred to or cited herein are incorporated by reference in their entirety, including all figures and tables, to the extent they are not inconsistent with the explicit teachings of this specification.

DEFINITIONS

As used herein, the singular forms "a," "an," and "the" designate both the singular and the plural, unless expressly stated to designate the singular only.

As used herein, "and/or" refers to and encompasses any and all possible combinations of one or more of the associated listed items, as well as the lack of combinations when interpreted in the alternative ("or").

Even if not explicitly stated, all numerical designations are preceded by the term "about" or "approximately." The term "about" or "approximately" means that the number comprehended is not limited to the exact number set forth herein, and is intended to refer to numbers substantially around the recited number while not departing from the scope of the invention. As used herein, "about" "or "approximately" will be understood by persons of ordinary skill in the art and will vary to some extent on the context in which it is used. If there are uses of the term which are not clear to persons of ordinary skill in the art given the context in which it is used, "about" or "approximately" will mean up to plus or minus 10%, 5%, 1%, or 0.1% of the particular term.

"Free," or "entirely free," as used herein, means that within the detection range of the instrument or process being used, the substance cannot be detected, or its presence cannot be confirmed.

"Essentially free," as used herein, means that only trace amounts of the substance can be detected. In the present disclosure, "essentially free" means that the substance is at a level of less than 0.1%, preferably less than 0.01%, and most preferably less than 0.001% by weight of the entire composition.

"Substantially free," as used herein, means that the substance is at a level of less than 5%, preferably less than 2%, and most preferably, less than 1% by weight of the entire composition.

"Botulinum toxin," as used herein, means a neurotoxin produced by Clostridium botulinum, as well as a botulinum toxin (or the light chain or the heavy chain thereof) made recombinantly by a non-Clostridial species. The phrase "botulinum toxin," as used herein, encompasses the botulinum toxin serotypes A, B, C, D, E, F and G. "Botulinum toxin" also encompasses "modified botulinum toxin."

"Botulinum toxin complex," or "toxin complex," as used herein, encompasses a complex released by Clostridial bacteria comprising a botulinum toxin protein molecule (~150 kDa for all serotypes), along with one or more associated non-toxin proteins. The complexes (e.g., molecular weights of approximately 300 kDa, 500 kDa, or 900 kDa), are believed to contain a non-toxin hemagglutinin protein ("NTH protein") and a non-toxin non-hemagglutinin protein ("NTNH protein"). Thus, a botulinum toxin complex may comprise a botulinum toxin molecule (the neurotoxic component) and one or more NTH and/or NTNH proteins. These two types of non-toxin proteins may stabilize the toxin molecule against denaturation and protect against digestive acids when toxin is ingested. Additionally, the larger (300 kDa and greater) botulinum toxin complexes may diffuse more slowly from intramuscular injection sites when compared to the botulinum toxin protein.

As an example of a toxin complex, the botulinum toxin type A complex can be produced by Clostridial bacterium as 900 kDa, 500 kDa and 300 kDa forms. Botulinum toxin types B and Cl are produced as a 500 kDa complex. Botulinum toxin type D is produced as both 300 kDa and 500 kDa complexes. Finally, botulinum toxin types E and F are produced as approximately 300 kDa complexes.

Referring to botulinum neurotoxin type A1, at pH greater than about 7, the non-toxin proteins are known to dissociate from the botulinum toxin protein molecule (~150 kDa). Thus, the toxin complexes can be dissociated into botulinum toxin protein and hemagglutinin proteins by subjecting the complex to a separation process, such as column chromatography, in a suitable buffer at a pH of about 7-8. However, the botulinum toxin protein is known to be unstable upon removal of the NTH and/or NTNH hemagglutinin protein(s), and the toxin loses its toxicity as pH and temperature rise or as a result of surface stretching or drying (e.g., during lyophilization or precipitation). Furthermore, the toxin loses its specific activity upon dilution (e.g., dilution during culturing, fermentation, and purification) unless a stabilizing agent is present.

"Modified botulinum toxin," as used herein, means a botulinum toxin that has had at least one of its amino acids deleted, modified, or replaced, as compared to a native botulinum toxin. Additionally, the modified botulinum toxin can be a recombinantly produced neurotoxin, or a derivative or fragment of a recombinantly made neurotoxin. A modified botulinum toxin retains at least one biological activity of the native botulinum toxin, such as, the ability to bind to a botulinum toxin receptor, or the ability to inhibit neurotransmitter release from a neuron. One example of a modified botulinum toxin is a botulinum toxin that has a light chain from one botulinum toxin serotype (such as serotype A), and a heavy chain from a different botulinum toxin serotype (such as serotype B). Thus, modified botulinum toxins may include a light and a heavy chain from two different serotypes selected from any of serotypes A, B, C, D, E, F, or G. Another example of a modified botulinum toxin is a botulinum toxin coupled to a neurotransmitter.

"Purified botulinum toxin," "pure toxin," "free botulinum toxin," "free toxin," or "botulinum toxin protein," as used herein, is defined as a botulinum toxin that is isolated, or substantially isolated, from other proteins, including NTH and/or NTNH proteins that form a botulinum toxin complex. A purified botulinum toxin may be greater than 95% pure, and preferably is greater than 99% pure.

"Medium" or "fermentation medium," as used herein, means any medium for cultivating bacteria, either for growth in order to produce a seed culture to be used for inoculation of the production medium, or the production medium in which the bacteria grow and produce their toxin.

"Animal product free" ("APF"), "essentially animal product free," or "substantially animal product free," as used herein, encompasses, respectively, "animal protein free," "essentially animal protein free," or "substantially animal protein free" and means the absence, essential absence, or substantial absence of blood derived, blood-pooled and other animal derived products or compounds. In this context, "free," "essentially free," and "substantially free" correspond to the definitions provided above. "Animal" means a mammal (such as a human), bird, reptile, fish, insect, spider or other animal species. "Animal" excludes microorganisms, such as bacteria. Thus, an APF medium or process or a substantially APF medium or process within the scope of the present invention can include a botulinum toxin or a Clostridial botulinum bacterium. For example, an APF process or a substantially APF process means a process which is either free or substantially free of animal derived proteins, such as immunoglobulins, human albumin, meat digest, meat by-products, and milk or dairy products or digests. Thus, an example of an APF process is a process (such as a bacterial culturing or bacterial fermentation process) which excludes meat and dairy products or meat or dairy by products.

"Bioburden," as used herein, means bacteria living on a surface, inside a device, or in a solution that has not been sterilized. For example, embodiments of the present technology comprise filtering buffer solutions to reduce "bioburden," bacteria living in the buffer solution or which have transferred into the solution from the surfaces (e.g., glassware surfaces) in contact with the solution.

"Tangential flow filtration" and "TFF," as used herein, refer to a mode of filtration which is useful for clarifying, concentrating, and purifying biological materials (e.g., proteins). In TFF, the solution or suspension containing macromolecules or biological materials may be pumped tangentially along the surface of a membrane. An applied pressure may force a portion of the solution through pores in the membrane. This solution is referred to herein as the "permeate" (or "filtrate"). Macromolecules, biological materials, and particulates that are too large to pass through the membrane pores may be retained on the upstream side. This solution is referred to herein as the "retentate." In contrast to normal filtration methods, retained materials do not build up at the surface of the membrane. Instead, they may be swept along the face of the membrane by tangential flow of fluid. See, e.g., L. Schwartz and K. Seeley, *Introduction to Tangential Flow Filtration for Laboratory and Process Development Applications*, PALL LIFE SCIENCES (2002), https://laboratory.pall.com/content/dam/pall/laboratory/literature-library/non-gated/id-34212.pdf.

"Permeate," as used herein, refers to the solution, suspension, or components thereof, that cross a filter or membrane (e.g., a diafiltration membrane, tangential flow filtration membrane, ultrafiltration membrane, microfiltration membrane, or hollow fiber filter) by passing through the pores of the filter or membrane, as well as the solution that has already crossed or passed through a filter or membrane. In general, solvent molecules and solute molecules that are smaller than the filter or membrane pore size will cross the filter or membrane, while molecules that are larger than the pore size will not cross the filter or membrane.

"Toxin-containing permeate," as used herein, refers to a permeate that contains botulinum toxin molecules, such as when the pore size of a filter is larger than the botulinum toxin molecules, such that botulinum toxin molecules cross the filter.

"Retentate," as used herein, refers to the solution, suspension, or components thereof, that do not cross a filter or membrane. For example, in the case of tangential flow filtration, the retentate is the component or portion of a solution or suspension that flows tangentially along, but does not cross, the filter or membrane. In general, molecules that are larger than the filter or membrane pore size will not cross the filter or membrane.

"Toxin-containing retentate," as used herein, refers to a retentate that contains botulinum toxin molecules, such as when the pore size of a filter is smaller than the botulinum toxin molecules, such that botulinum toxin molecules cannot cross the filter.

"Transmembrane pressure" or "TMP," as used herein, refers to the pressure differential gradient that is applied along the length of a filtration membrane to cause fluid and filterable solutes to flow through or across the filter or membrane.

"Diafiltration," as used herein, refers to a specialized class of filtration in which a retentate is diluted with solvent and re-filtered, to reduce the concentration of soluble permeate components. Diafiltration may or may not lead to an increase in the concentration of retained components, including proteins (e.g., BoNT/A). For example, in continuous diafiltration, a solvent is continuously added to the retentate at the same rate as the permeate is generated. In this case, the retentate volume and the concentration of retained components does not change during the process. On the other hand, in discontinuous or sequential dilution diafiltration, a filtration step is followed by the addition of solvent to the retentate side; if the volume of solvent added to the retentate side is less than the volume of permeate generated, then the retained components will have a higher concentration than in the original solution. Diafiltration may be used to alter the pH, ionic strength, salt composition, or other properties of a solution or suspension of macromolecules (e.g., proteins such as BoNT/A). See, e.g., L. Schwartz, *Diafiltration: A Fast, Efficient, Method for Desalting, or Buffer Exchange of Biological Samples*, PALL LIFE SCIENCES (2003), https://laboratory.pall.com/content/dam/pall/laboratory/literature-library/non-gated/02.0629_Buffer_Exchange_STR.pdf (last visited Dec. 9, 2019).

"Diafiltration volume" or "DV," as used herein, refers to a total volume exchanged during the process of diafiltration. A single DV is equal to the volume of retentate at the start of diafiltration. For example, if the original solution volume is one liter, the diafiltration process produces a permeate volume approximately equal to one liter, and the retentate is maintained at, or restored to, a volume of 1 L (e.g., using a buffer solution), then the original solution or suspension has been filtered or washed with one DV. Continuous diafiltration allows for exchange of multiple DVs. For example, if the original retentate volume is one liter, and the diafiltration process produces a permeate volume equal to approximately five liters, then the original solution or suspension has been filtered or washed with five DVs.

"Microfiltration," as used herein, refers to a class of filtration that typically uses membrane pore sizes ranging from approximately 0.1 µm to approximately 10 µm and larger. See e.g., Munir Cheryan, *Ultrafiltration and Microfiltration Handbook* (2d ed. 1998).

"Ultrafiltration," as used herein, refers to a class of filtration that typically uses membrane pore sizes ranging from approximately 0.1 µm to approximately 0.01 µm and smaller. Alternatively, nominal membrane pore sizes may be expressed in terms of molecular weight, for example about 30 kDa and below to about 750 kDa and below, preferably 50 kDa and below or 30 kDa and below. It may refer to any such technique in which a solution or a suspension is subjected to a semi-permeable membrane that retains macromolecules while allowing solvent and small solute molecules to pass through. Ultrafiltration may be used to concentrate macromolecules (e.g., proteins such as BoNT/A) in a solution or suspension. See e.g., Munir Cheryan, *Ultrafiltration and Microfiltration Handbook* (2d ed. 1998).

"Chromatography" or "chromatographic separation," as used herein refers to a physical separation method by which components (e.g., proteins) to be separated are distributed between two phases: a stationary phase and a mobile phase. Molecules to be separated are dissolved in the mobile phase, which travels through the stationary phase (e.g., a porous gel, charged polymer beads, etc.). Separation is possible because the different molecules in the sample will exhibit different affinities for the stationary phase, leading to separation of similar molecules. Molecules with higher affinity toward the stationary phase will tend to move more slowly through the stationary phase than molecules with weaker affinity. As applied to proteins (e.g., botulinum toxins), chromatographic separation can separate proteins on the basis of many different properties. For example, in gel filtration chromatography, proteins in the mobile phase are separated based on size because differently-sized proteins travel through a porous stationary phase, in which smaller proteins become trapped, slowing their travel. In ion-exchange chromatography, proteins are separated based on their charge and resulting coulombic interactions with the stationary phase.

"Chromatography column" or simply "column," as used herein, refers to a component containing a chromatography matrix (e.g., stationary phase or solid phase), and configured such that a mobile phase, e.g., a fluidic sample or buffer, can pass through the column, thereby passing through the stationary phase retained in the column. Non-limiting examples of such columns are those commercially available from G.E. Healthcare. See *Chromatography Products: Chromatography columns, systems, resins, and buffer management solutions*, G.E. HEALTHCARE, www.gehealthcare.com.

"Fraction," as used herein, refers to a portion of the mobile phase that is collected as it exits the column. The components in the "fraction" will vary based on the time during which it is collected. Faster-moving "fractions," collected at early times, will contain relatively high concentrations of molecules that move more quickly through the stationary phase; slower-moving "fractions," collected at later times, will contain relatively high concentrations of molecules that move more slowly through the stationary phase.

"Toxin-containing fraction," as used herein, means a fraction collected from a chromatography column during the time period when botulinum toxin molecules (e.g., BoNT/A molecules) exit the column in the mobile phase.

"Ion exchange chromatography" or "IEX," as used herein, refers to a chromatographic separation technique that separates molecules based on the polarity and magnitude of their charges (e.g., +2, +1, neutral, −1, −2, etc.). IEX retains analyte molecules (e.g., proteins) on the stationary phase based on the extent of their coulombic interactions with the stationary phase. The stationary phase surface displays ionic functional groups that interact with analyte (e.g., botulinum toxin) ions of opposite charge. To achieve electroneutrality, these stationary charges interact with exchangeable counterions in the mobile phase. Analyte molecules compete with these exchangeable counterions for binding. Analyte molecules are retained or "eluted" based on their charge. Initially, molecules which do not bind or which bind weakly to the stationary phase are first to wash away. See generally, e.g., *Ion Exchange Chromatography: Principles and Methods*, G.E. HEALTHCARE (2016), www.gehealthcare.com.

"Anion exchange chromatography" or "AIEX," as used herein, means a type of ion exchange chromatography in which anionic analyte molecules (e.g., proteins) are retained on a cationic stationary phase. See generally, e.g., *Ion Exchange Chromatography: Principles and Methods*, G.E. HEALTHCARE (2016), www.gehealthcare.com.

"Cation exchange chromatography" or "CIEX," as used herein, means a type of ion exchange chromatography in which cationic analyte molecules (e.g., proteins) are retained on an anionic stationary phase. See generally, e.g., *Ion Exchange Chromatography: Principles and Methods*, G.E. HEALTHCARE (2016), www.gehealthcare.com.

"Elution," as used herein, refers to desorbing molecules bound to a stationary phase by altering the solution conditions within a chromatography column. Exchangeable counterion concentrations can be increased, or the pH can be altered to affect analyte binding affinity. Molecules that lose affinity for the stationary phase and enter the mobile phase "elute" from the column.

"Eluant" or "wash solution," as used herein, refers to an agent, typically a solution, which is used to modify adsorption of an analyte (e.g., botulinum toxin molecule) to a stationary phase and/or to remove unbound materials from the stationary phase. The elution characteristics of an eluant can depend, for example, on pH, ionic strength, and detergent strength, among other factors.

"Eluate," as used herein, refers to a solution (e.g., a wash solution or buffer solution) containing unbound materials (including "eluted" or desorbed analyte molecules, e.g., botulinum toxin molecules) that travel through the stationary phase and exit the column in a chromatographic separation.

"Toxin-containing eluant," as used herein, refers to the mobile phase containing eluted botulinum toxin molecules, which exits the column in a chromatographic separation column.

"Gel filtration chromatography" or "gel filtration," as used herein, means a type of size exclusion chromatography that can be used to either fractionate molecules (e.g., proteins, protein complexes, polysaccharides, nucleic acids, small molecules, etc.) in a sample into fractions, each of which has a particular size range. Alternatively, "gel filtration" can remove all molecules larger than a particular cutoff size from the sample. In a gel filtration chromatography column, the stationary phase includes a porous matrix (e.g., beads), and the mobile phase is a solution (e.g., a buffer solution) that flows around the matrix. The matrix may have a defined pore size range, known as the "fractionation range." Molecules and complexes that are too large to enter the pores remain in the mobile phase and travel through the column with the buffer solution. Smaller molecules and complexes that can travel into the pores enter the stationary phase and move through the gel filtration column by a longer path (i.e., through the pores, rather than around the beads). Molecules that can enter the stationary phase are fractionated by size. Smaller molecules will migrate through the pores and will be slowed more than larger molecules that cannot easily enter the pores. Larger molecules are therefore eluted more quickly. Thus, sample components above the fractionation range will elute before components within the fractionation range. See generally, e.g., *Size Exclusion Chromatography: Principles and Methods*, G.E. HEALTHCARE (2018), https://cdn.gelifesciences.com/dmm3bwsv3/AssetStream.aspx?mediaformatid=10061&destinationid=10016&assetid=11639 (last visited Dec. 9, 2019).

"Single-use," as used herein in reference to components of a chromatography system, refers to components that are configured to be replaced or discarded after each use, and that are not intended to be re-used in the system.

Fermentation Medium

Referring now to FIG. 1, a method 100 for purifying a botulinum toxin may comprise obtaining 104 a solution (e.g., a fermentation medium) comprising a botulinum toxin (e.g., BoNT/A). In some embodiments, the solution may be a fermentation medium, preferably the supernatant from a fermentation medium, comprising whole *C. botulinum* cells, lysed bacteria, culture media nutrients (e.g., vegetable peptones), and fermentation by-products. In some embodiments, the fermentation medium may be substantially free, essentially free, or free of animal products (i.e., an "APF" fermentation medium), such as the fermentation medium described in the U.S. provisional patent application No. 62/951,549.

A botulinum toxin may be isolated and purified from a fermentation medium using protein purification methods known to those of ordinary skill in the art of protein purification. See generally, e.g., Munir Cheryan, *Ultrafiltration and Microfiltration Handbook* (2d ed. 1998); Ozutsumi et al., 49 *Appl. Envtl. Microbiol.* 939 (1985); G E Healthcare, *Strategies for Protein Purification Handbook* (2010).

The purification methods of the present disclosure as described herein may comprise purifying the botulinum toxin complex (e.g., the 900 kDa complex), which is more stable than the 150 kDa botulinum toxin protein molecule, followed by separating and further purifying the toxin protein molecule from the non-toxin proteins (i.e., NTH and/or NTNH proteins) to obtain a purified botulinum toxin (~150 kDa) product without any precipitation, centrifugation, or lyophilization steps. The product toxin solution may be free, essentially free, or substantially free of toxin complexes and/or animal products. Further, because no precipitation, lyophilization, or centrifugation steps are required, the botulinum toxin can be recovered in solution, as opposed to a powder which must be reconstituted by the end user prior to administration to a patient.

Filtration

Filtration 1

Referring still to FIG. 1, the method may comprise a first filtration ("Filtration 1") 106, which comprises filtering the medium or culture solution to remove whole or lysed bacteria, spores (e.g., *C. botulinum* spores), and debris to provide a toxin-containing permeate 107. The toxin-containing permeate 107 comprises a botulinum toxin and various impurities and may be processed to obtain a concentrated botulinum toxin (e.g., BoNT/A).

In particular embodiments, the first filtration 106 comprises removing whole or lysed *C. botulinum* cells (or components thereof) from the fermentation medium using any suitable filtration technique (e.g., diafiltration, tangential flow microfiltration, tangential flow ultrafiltration, hollow fiber filtration, etc.). Filtration techniques for purifying biomolecules such as proteins are well known in the art. See, e.g., L. Schwartz and K. Seeley, *Introduction to Tangential Flow Filtration for Laboratory and Process Development Applications*, PALL LIFE SCIENCES (2002), https://laboratory.pall.com/content/dam/pall/laboratory/literature-library/non-gated/id-34212.pdf (last visited Dec. 9, 2019); Munir Cheryan, *Ultrafiltration and Microfiltration Handbook* (2d ed. 1998). In an embodiment, first filtration 106 comprises tangential flow microfiltration.

In some embodiments, the first filtration step 106 may use a filter (e.g., a hollow fiber filter, tangential flow filtration membrane, etc.), wherein at least the solvent and botulinum toxin molecules or toxin complexes pass through the filter to produce a toxin-containing permeate 107, while the whole or lysed cells, if present, do not pass through the filter and are retained in the retentate. In some embodiments, the filter comprises pores between approximately 0.1 μm and 10 μm in diameter (e.g., approximately 0.2 μm). In an embodiment, the filter is a hollow fiber filter.

In some embodiments, the first filtration step 106 may further comprise concentrating the toxin-containing permeate 107 and recovering additional botulinum toxin molecules from the retentate and/or toxin-containing permeate 107 by any suitable method (e.g., diafiltration).

Filtration 2

Referring still to FIG. 1, the method may further comprise a second filtration ("Filtration 2") 108 for removing fermentation medium residues (e.g., small peptides, carbohydrates, etc.) from the toxin-containing permeate 107. This step may comprise any suitable filtration technique (e.g., diafiltration, tangential flow microfiltration, tangential flow ultrafiltration, hollow fiber filtration, etc.). In an embodiment, a second filtration 108 for removing fermentation medium residues comprises ultrafiltration using a tangential flow filter (e.g., a hollow fiber filter) with a pore size that permits fermentation medium residues to pass through the filter while retaining the botulinum toxin molecules and/or toxin complexes. For example, in some embodiments, the filter may have a pore size of 150 kDa or less, 100 kDa or less, or 50 kDa or less. In this case, the botulinum toxin molecules or botulinum toxin complexes remain in the retentate from the second filtration 108, to produce a clarified culture 110 which contains botulinum toxin molecules or botulinum toxin complexes but is free, essentially free, or substantially free of whole or lysed *C. botulinum* cells (or components thereof), as well as fermentation medium residues (e.g., small peptides, carbohydrates, etc.).

In some embodiments, the clarified culture 110 may be collected and further purified in subsequent processing steps without precipitating the botulinum toxin molecules or toxin complexes from solution at any time during the purification process. Advantageously, this enhances overall process yields, preserves toxin activity, and eliminates the need for reconstituting a lyophilized drug product by the end user.

Column Chromatography

First Chromatographic Separation

Referring still to FIG. 1, some embodiments of the method 100 further comprise purifying the clarified culture 110 using a first chromatographic separation 112 to produce a first toxin-containing fraction 114. The purpose of this step is to separate the botulinum toxin complexes from nucleic acids (e.g., DNA and RNA) that are present in the clarified culture 110. The first chromatographic separation 112 may comprise any suitable chromatographic separation technique (e.g., ion exchange chromatography—including anion exchange chromatography or cation exchange chromatography, gel filtration chromatography, high-performance liquid chromatography, affinity chromatography, etc.). In some embodiments, the first chromatographic separation may comprise anion exchange chromatography (AIEX). In an embodiment, the first chromatographic separation comprises AIEX over Q Sepharose.

The first chromatographic separation 112 may comprise contacting the first chromatography column with the clarified culture 110, which comprises botulinum toxins or toxin complexes. The mobile phase (comprising the clarified culture 110) may flow through a first stationary phase to separate botulinum toxin from other residual impurities (e.g., nucleic acids). The first stationary phase may comprise any suitable chromatography matrix (e.g., an agarose bead-based medium, such as Q Sepharose FF (GE Healthcare)).

In particular embodiments, the clarified culture 110 may be conditioned for column chromatography (e.g., by dilution in a buffer solution or by buffer exchange). In a particular embodiment, the clarified culture 110 may be conditioned in a phosphate buffer at pH less than or equal to about 7.5, preferably at a pH of less than or equal to about 7, more preferably at a pH of about 6.1. In some embodiments the clarified culture 110 may be conditioned in a phosphate buffer at a pH of about 7.5, about 7.4, about 7.3, about 7.2, about 7.1, about 7.0, about 6.9, about 6.8, about 6.7, about 6.6, about 6.5, about 6.4, about 6.3, about 6.2, about 6.1, about 6.0, about 5.9, about 5.8, about 5.7, about 5.6, or about 5.5.

In particular embodiments, the first chromatographic separation 112 may further comprise washing the botulinum toxins or toxin complexes through the stationary phase using a suitable buffer solution (e.g., a phosphate buffer at pH 6.1). The purpose of this step is wash as much of the botulinum toxin complexes through the column as possible while separating the botulinum toxin complexes from other proteins and removing nucleic acids (RNA and DNA). In some embodiments, the salt concentration of this buffer solution is selected to maximize the amount of botulinum toxins or toxin complexes flowing through the column, while minimizing the amount of other proteins flowing through the column.

In some embodiments, the buffer solution comprises sodium chloride (NaCl) at a concentration of no less than about 15 mM, no less than about 20 mM, no less than about 30 mM, no less than about 40 mM, no less than about 50 mM, no less than about 60 mM, no less than about 70 mM, no less than about 80 mM, no less than about 90 mM, no less than about 100 mM, no less than about 150 mM, no less than about 200 mM, no less than about 250 mM, no less than about 300 mM, no less than about 350 mM, no less than about 400 mM, no less than about 450 mM, or no less than about 500 mM (and ranges in between). In some embodiments, the buffer solution comprises NaCl at a concentration of about 15 mM, about 20 mM, about 30 mM, about 40 mM, about 50 mM, about 60 mM, about 70 mM, about 80 mM, about 90 mM, about 100 mM, about 150 mM, about 200 mM, about 250 mM, about 300 mM, about 350 mM, about 400 mM, about 450 mM, or about 500 mM. In an embodiment, the buffer solution comprises NaCl at a concentration of about 150 mM.

In a particular embodiment, the first chromatography column may operate in flow-through mode, wherein the botulinum toxins and/or toxin complexes may pass through the column without adsorbing to the stationary phase. In this configuration, eluting the botulinum toxin or toxin complexes from the column is not required. Instead, the botulinum toxin or toxin complexes may exit the column in a toxin-containing fraction 114, which may be collected and further purified in subsequent processing steps. In some embodiments, collection of the toxin-containing fraction 114 is monitored by flow-through absorbance detection at 280 nm ("$A_{280}$"), wherein the toxin-containing fraction 114 is collected during the appearance of the $A_{280}$ peak.

Second Chromatographic Separation

Some embodiments of the method 100 further comprise a second chromatographic separation step 116 wherein the toxin-containing fraction 114 may be purified to remove bulk impurities (e.g., other proteins) and produce a first toxin-containing eluant 118. The second chromatographic separation 116 may comprise any suitable chromatographic separation technique (e.g., ion exchange chromatography—including anion exchange chromatography or cation exchange chromatography, gel filtration chromatography, high-performance liquid chromatography, affinity chromatography, etc.) In a particular embodiment the second chromatographic separation 116 comprises cation exchange chromatography (CIEX).

Second chromatographic separation 116 may comprise contacting the botulinum toxins or toxin complexes with a second chromatography column, wherein a mobile phase comprising the toxin-containing fraction 114 travels through a second stationary phase. The second stationary phase may comprise any suitable chromatography matrix (e.g., an agarose bead-based medium, such as SP Sepharose FF (GE Healthcare)). In embodiments, the botulinum toxin molecules or toxin complexes may bind to the second stationary phase. In embodiments, the botulinum toxins or toxin complexes may bind to the second stationary phase, and the $A_{280}$ of the solution washing through the column is monitored. In embodiments, the column is washed with a suitable buffer solution (e.g., 50 mM sodium acetate, 0.2% polysorbate 20, pH 4.5) until $A_{280}$ has returned to a baseline value, indicating that all of the toxin-containing eluant 118 has passed through the column, though the botulinum toxins and toxin complexes may remain bound to the second stationary phase.

In some embodiments, second chromatographic separation 116 may further comprise further washing the second chromatography column with a wash buffer to remove any weakly bound proteins, while the botulinum toxins and toxin complexes remain strongly bound to the second stationary phase. This wash step may use any suitable buffer solution (e.g. 50 mM sodium acetate, 0.2% polysorbate 20, pH 4.5, 210 mM NaCl). In some embodiments, this wash buffer may contain NaCl at a concentration of 250 mM or less, 240 mM or less, 230 mM or less, 220 mM or less, 210 mM or less, 200 mM or less, 190 mM or less, 180 mM or less, 170 mM, or less, 160 mM or less, 150 mM or less, 140 mM or less, 130 mM or less, 120 mM or less, 110 mM or less, or 100 mM less, or lower. In some embodiments, this wash buffer contains NaCl at a concentration of about 100 mM, about 110 mM, about 120 mM, about 130 mM, about 140 mM, about 150 mM, about 160 mM, about 170 mM, about 180 mM, about 190 mM, about 200 mM, about 210 mM, about 220 mM, about 230 mM, about 240 mM, or about 250 mM.

In some embodiments, second chromatographic separation 116 may further comprise conditioning the toxin-containing fraction 114 for column chromatography (e.g., by dilution or buffer exchange) before contacting the toxin-containing fraction 114 with the second chromatography column. For example, in some embodiments, the toxin-containing fraction 114 may be conditioned by dilution in an acetic acid-acetate buffer at a pH of between about 3 and about 7, between about 3.5 and about 6, or between about 4 and about 5, preferably at a pH of about 4.5. In some embodiments, the toxin-containing fraction is conditioned in a buffer with pH of about 3.5, about 3.6, about 3.7, about 3.8, about 3.9, about 4.0, about 4.1, about 4.2, about 4.3, about 4.4, about 4.5, about 4.6, about 4.7, about 4.8, about 4.9, about 5.0, about 5.1, about 5.2, about 5.3, about 5.4, or about 5.5.

In some embodiments, second chromatographic separation 116 may further comprise eluting the botulinum toxins or toxin complexes from the column to produce a first toxin-containing eluant 118. The elution may comprise washing the column with one or more buffer solutions that promote toxin (or toxin complex) dissociation from the stationary phase (e.g., by altering pH or ionic strength). This elution buffer may be any suitable buffer solution for promoting toxin or toxin complex dissociation from the second stationary phase (e.g., 50 mM sodium acetate, 0.2% polysorbate 20, pH 4.5). For example, such a buffer solution may comprise an acetic acid-acetate buffer with a pH of between about 3 and about 7, between about 4 and about 6, or between about 4 and about 5, or about 4.5. In some embodiments, the toxin-containing fraction is eluted from the second chromatography column using a buffer with pH of about 3.5, about 3.6, about 3.7, about 3.8, about 3.9, about 4.0, about 4.1, about 4.2, about 4.3, about 4.4, about 4.5, about 4.6, about 4.7, about 4.8, about 4.9, about 5.0, about 5.1, about 5.2, about 5.3, about 5.4, or about 5.5.

In some embodiments, this elution buffer may comprise a salt at a concentration sufficient to promote dissociation of the botulinum toxins or toxin complexes from the second stationary phase. In embodiments, this elution buffer contains NaCl at a concentration of 230 mM or greater, 240 mM or greater, 250 mM or greater, 260 mM or greater, 270 mM or greater, 280 mM or greater, 290 mM or greater, 300 mM or greater, 350 mM or greater, or 400 mM or greater. In some embodiments, this elution buffer comprises NaCl at a concentration of about 230 mM, about 240 mM, about 250 mM, about 260 mM, about 270 mM, about 280 mM, about 290 mM, about 300 mM, about 310 mM, about 320 mM, about 330 mM, about 340 mM, about 350 mM, about 360 mM, about 370 mM, about 380 mM, about 390 mM, or about 400 mM, or any value in between.

In embodiments, the botulinum toxin molecules or toxin complexes are eluted from the column to produce a first toxin-containing eluant 118, which may be collected and further purified in subsequent processing steps. In some embodiments, the $A_{280}$ is measured during elution from the second chromatography column to detect the presence of botulinum toxin molecules or toxin complexes eluting from the column, and the $A_{280}$ peak is collected as a single fraction to produce the first toxin-containing eluant 118.

Filtration 3

Some embodiments of the method further comprise a third filtration step 120 carried out after the second chromatographic separation 116 and before a third chromatographic separation 124. In an embodiment, third filtration 120 dissociates NTH and/or NTNH proteins from the botulinum toxin complexes. In embodiments, third filtration 120 comprises a buffer exchange, which may increase the pH of the first toxin-containing eluant 118 (e.g., from about 4.5 to about 8.0). In embodiments, the buffer exchange may reduce the salt concentration in the toxin-containing eluant 118 (e.g., from about 270 mM to about 50 mM). In embodiments, third filtration 120 may concentrate the toxin-containing eluant 118 (e.g., by reducing its volume from about 300 mL to about 50-60 mL).

Third filtration 120 may comprise any suitable filtration technique (e.g., diafiltration, tangential flow microfiltration, tangential flow ultrafiltration, hollow fiber filtration, etc.). In a particular embodiment, third filtration 120 may comprise ultrafiltration using a tangential flow filter (e.g., a hollow fiber filter) with a pore size suitable to retain the dissociated botulinum toxin molecules (150 kDa) and NTH and/or NTNH proteins. In some embodiments, the filter may have a pore size of no greater than about 150 kDa, no greater than about 140 kDa, no greater than about 130 kDa, no greater than about 120 kDa, no greater than about 110 kDa, no greater than about 100 kDa, no greater than about 90 kDa, no greater than about 80 kDa, no greater than about 70 kDa, no greater than about 60 kDa, no greater than about 50 kDa, no greater than about 40 kDa, no greater than about 30 kDa, or no greater than about 20 kDa (or ranges in between). For example, the tangential flow filter may have a pore size of about 20 kDa, about 25 kDa, about 30 kDa, about 35 kDa, about 40 kDa, about 45 kDa, about 50 kDa, about 55 kDa, about 60 kDa, about 65 kDa, about 70 kDa, about 75 kDa, about 80 kDa, about 85 kDa, about 90 kDa, about 95 kDa, about 100 kDa, about 110 kDa, about 120 kDa, about 130 kDa, about 140 kDa, or about 150 kDa, or any value in between. In an embodiment, the filter has a pore size of about 30 kDa.

In some embodiments, the toxin-containing eluant 118 may be concentrated by ultrafiltration, then washed using diafiltration against a buffer solution to dissociate NTH and/or NTNH proteins from the botulinum toxin complexes. In a particular embodiment, the botulinum toxin protein molecules and the NTH and/or NTNH proteins may remain in the retentate 121 (i.e., the toxin-containing retentate), while other filtration and chromatography medium residues are separated into the permeate.

The buffer solution used for third filtration 120 may be any suitable buffer solution (e.g., a Tris-HCl buffer) for dissociating NTH and/or NTNH proteins in the toxin complexes from the botulinum toxin molecules. In some embodiments, the buffer solution used for third filtration 120 may be the same buffer used to condition a third chromatography column (e.g., a tris-HCl buffer with a pH of greater than 7, as discussed below).

In some embodiments, the buffer solution used for third filtration 120 has a pH suitable to dissociate NTH and/or NTNH proteins from the botulinum toxin protein molecules. In some embodiments, the pH of the buffer solution is at least about 7, preferably between about 7 and about 10, preferably between about 7 and about 9, preferably between about 7.5 and about 8.5, preferably about 8.0. In some embodiments, the pH of the buffer solution for third filtration 120 may be about 7.5, about 7.6, about 7.7, about 7.8, about 7.9, about 8.0, about 8.1, about 8.2, about 8.3, about 8.4, about 8.5, about 8.6, about 8.7, about 8.8, about 8.9, about 9.0, about 9.5, or about 10.0. In an embodiment, the pH of the buffer solution for third filtration 120 is about 8.0.

In some embodiments, the toxin-containing retentate 121 from third filtration 120 may be collected and further purified in subsequent processing steps without precipitating the botulinum toxin molecules or toxin complexes from solution at any point in the purification process. Advantageously, this enhances overall process yields and eliminates the need for reconstituting a lyophilized drug product at any point during the purification process or by the end user.

Third Chromatographic Separation

Some embodiments of the method 100 further comprise a third chromatographic separation 124 to separate and remove NTH and/or NTNH proteins dissociated from the toxin complexes during the preceding third filtration 120, while retaining the botulinum toxin protein molecules. The resulting second toxin-containing eluant 126 may comprise free botulinum toxin protein molecules (~150 kDa) and may be free, essentially free, or substantially free of toxin complexes. Third chromatographic separation 124 may comprise any suitable chromatographic separation technique (e.g., ion exchange chromatography—including anion exchange chromatography or cation exchange chromatography, gel filtration chromatography, high-pressure liquid chromatography, affinity chromatography, etc.). In a particular embodiment, third chromatographic separation 124 may comprise anion exchange chromatography (AIEX).

The third chromatographic separation 124 may comprise contacting the botulinum toxins or toxin complexes in the toxin-containing retentate 121 from third filtration 120 with a third chromatography column, wherein a mobile phase comprising the toxin-containing retentate 121 (and the free botulinum toxin protein molecules therein) travels through a third stationary phase. The third stationary phase may comprise any suitable chromatography matrix (e.g., an agarose bead-based medium, such as Q Sepharose FF (GE Healthcare)).

In some embodiments, third chromatographic separation 124 may further comprise conditioning the toxin-containing retentate 121 from third filtration 120 for column chromatography (e.g., by dilution, buffer exchange, filtration, or a combination thereof). For example, the toxin-containing retentate 121 may be diluted in a buffer solution, such as a tris-HCl buffer at a pH of greater than 7, preferably between 7 and 10, preferably between about 7 and about 9, preferably between about 7.5 and about 8.5, or preferably at a pH of about 8.0. In some embodiments, the pH of the buffer solution is about 7.5, about 7.6, about 7.7, about 7.8, about 7.9, about 8.0, about 8.1, about 8.2, about 8.3, about 8.4, about 8.5, about 8.6, about 8.7, about 8.8, about 8.9, about 9.0, about 9.5, or about 10.0.

In some embodiments, botulinum toxin protein molecules, toxin complexes, and NTH and/or NTNH proteins in the toxin-containing retentate 121 may adsorb to the third stationary phase. In some embodiments, the toxin-containing retentate 121 is loaded onto the third chromatography column, and washed with a wash buffer solution to remove non-toxin impurities that remain unbound to the third stationary phase. The wash buffer may be any suitable buffer solution (e.g., 20 mM tris/HCl, 50 mM NaCl, 0.2% polysorbate 20, pH 8.0), and the $A_{280}$ of the solution passing through the column may be monitored until the $A_{280}$ reaches a baseline value, indicating all non-bound material has flowed through the third chromatography column.

Third chromatographic separation 124 may further comprise eluting the botulinum toxin proteins bound to the third stationary phase to produce a second toxin-containing eluant 126. The elution may comprise washing the column with one or more buffer solutions to desorb botulinum toxin protein molecules from the stationary phase (e.g., by altering pH, ionic strength, etc.) using any suitable protein-compatible buffer solution. For example, the botulinum toxin molecules may be eluted from the third stationary phase using a tris-HCl buffer solution at a pH of greater than 7, preferably between 7 and 10, preferably between about 7 and about 9, preferably between about 7.5 and about 8.5, or preferably at a pH of about 8.0. In some embodiments, the pH of the buffer solution is about 7.5, about 7.6, about 7.7, about 7.8, about 7.9, about 8.0, about 8.1, about 8.2, about 8.3, about 8.4, or about 8.5.

In some embodiments, the buffer solution used to elute the botulinum toxin molecules from the third chromatography column may contain a salt (e.g., NaCl). In some embodiments, the buffer solution used to elute the botulinum toxin molecules from the third chromatography column contains NaCl at a concentration suitable to promote desorption of the botulinum toxin molecules from the third stationary phase. In embodiments, this elution buffer may comprise NaCl at a concentration of between about 25 mM and about 250 mM, preferably between about 50 mM and about 200 mM, preferably between about 100 mM and about 150 mM, preferably about 120 mM. In some embodiments, the elution buffer used to elute the botulinum toxin molecules from the third chromatography column contains NaCl at a concentration of about 50 mM, about 60 mM, about 70 mM, about 80 mM, about 90 mM, about 100 mM, about 110 mM, about 115 mM, about 120 mM, about 125 mM, about 130 mM, about 135 mM, about 140 mM, about 145 mM, about 150 mM, about 155 mM, about 160 mM, about 165 mM, about 170 mM, about 175 mM, about 180 mM, about 185 mM, about 190 mM, about 195 mM, about 200 mM, about 210 mM, about 220 mM, about 230 mM, about 240 mM, or about 250 mM. In an embodiment, the buffer solution used to elute botulinum toxin molecules from the third chromatography column contains NaCl at about 120 mM or about 150 mM.

In some embodiments, the buffer solution used to elute the botulinum toxin molecules from the third chromatography column further comprises a surfactant (e.g., polysorbate 20). In some embodiments, the buffer solution used to elute the botulinum toxin molecules from the third chromatography column comprises a surfactant at a concentration of about 0.05 vol.-% to about 1.0 vol.-%, preferably about 0.10 vol.-% to about 0.5 vol.-%, preferably about 0.15 vol.-% to about 0.25 vol.-%, preferably about 0.20 vol.-%. In some embodiments, the buffer solution used to elute the botulinum toxin molecules from the third chromatography column contains a surfactant at a concentration of about 0.05 vol.-%, about 0.10 vol.-%, about 0.15 vol.-%, about 0.20 vol.-%, about 0.25 vol.-%, about 0.30 vol.-%, about 0.35 vol.-%, about 0.40 vol.-%, about 0.45 vol.-%, about 0.50 vol.-%, about 0.55 vol.-%, about 0.60 vol.-%, about 0.65 vol.-%, about 0.70 vol.-%, about 0.75 vol.-%, about 0.80 vol.-%, about 0.85 vol.-%, about 0.90 vol.-%, about 0.95 vol.-%, or about 1.0 vol.-%. In an embodiment, the buffer solution used to elute the botulinum toxin molecules from the third chromatography column contains polysorbate 20 at a concentration of about 0.20 vol.-%.

In particular embodiments, second toxin-containing fraction 126 is collected as it is eluted from the column and further purified in subsequent process steps without precipitating or lyophilizing the botulinum toxin proteins. In an embodiment, second toxin-containing fraction 126 is directly injected onto a fourth chromatography column for final polishing (i.e., removing high-molecular-weight contaminants, including aggregates of the target protein, and low-molecular-weight contaminants, including fragments of the target protein, and other impurities which may not be removed in the preceding purification steps).

Fourth Chromatographic Separation

Some embodiments of the method 100 further comprise a final polishing step to remove aggregates and/or protein impurities from second toxin-containing fraction 126, using a fourth chromatographic separation 128 to produce a third toxin-containing eluant 130. Fourth chromatographic separation 128 may comprise any suitable chromatographic separation technique (e.g., ion exchange chromatography—including anion exchange chromatography or cation exchange chromatography, gel filtration chromatography, high-pressure liquid chromatography, affinity chromatography, etc.). For example, in an embodiment, fourth chromatographic separation 128 may comprise gel filtration chromatography.

Fourth chromatographic separation 128 may use any suitable protein-compatible chromatography matrix capable of separating pure botulinum toxin protein molecules from aggregated botulinum toxins and other protein impurities. For example, fourth chromatographic separation 128 may use Superdex 200 chromatography medium (GE Healthcare)).

Fourth chromatographic separation 128 may further comprise conditioning the second toxin-containing eluant 126 for column chromatography (e.g., by dilution, buffer exchange, filtration, or a combination thereof). Alternatively, in a particular embodiment, a second toxin-containing eluant 126 from third chromatographic separation 124 may be directly injected onto the fourth chromatography column without further conditioning. In this configuration, the third and fourth chromatography columns may be interconnected to permit direct loading of the second toxin-containing eluant 126.

Fourth chromatographic separation 128 may further comprise washing botulinum toxin molecules through the stationary phase using a wash solution or buffer to provide a third toxin-containing eluant 130. The buffer solution may be any suitable, protein-compatible buffer. In a particular embodiment, the buffer solution may be an acetic acid-acetate buffer solution at a pH of less than about 7, preferably between about 5 and about 7, preferably between about 6 and about 7, preferably between about 6.6 and about 6.9. In some embodiments, the pH of this buffer solution may be about 6.5, about 6.6, about 6.7, about 6.8, about 6.9, or about 7.0.

In some embodiments, the buffer solution used to wash botulinum toxin molecules through the stationary phase in the fourth chromatographic column further comprises a salt (e.g., NaCl). In some embodiments, this wash buffer solution contains NaCl at a concentration of about 100 mM to about 1 M, preferably about 200 mM to about 600 mM, more preferably about 300 mM to about 500 mM, most preferably about 400 mM. In some embodiments, this buffer solution contains NaCl at a concentration of about 100 mM, about 150 mM, about 200 mM, about 250 mM, about 300 mM, about 310 mM, about 320 mM, about 330 mM, about 340 mM, about 350 mM, about 360 mM, about 370 mM, about 380 mM, about 390 mM, about 400 mM, about 410 mM, about 420 mM, about 430 mM, about 440 mM, about 450 mM, about 500 mM, about 550 mM, about 600 mM, about 650 mM, about 700 mM, about 750 mM, about 800 mM, about 850 mM, about 900 mM, about 950 mM, or about 1 M. In an embodiment, the buffer solution used to wash botulinum toxin molecules through the stationary phase in the fourth chromatography column contains about 350 mM NaCl or about 370 mM NaCl.

In some embodiments, the buffer solution used to wash botulinum toxin molecules through the stationary phase of the fourth chromatography column further comprises a surfactant (e.g., polysorbate 20). In some embodiments, this buffer solution contains a surfactant at a concentration of about 0.05 vol.-% to about 1.0 vol.-%, preferably about 0.10 vol.-% to about 0.5 vol.-%, preferably about 0.15 vol.-% to about 0.25 vol.-%, preferably about 0.20 vol.-%. In some embodiments, this buffer solution contains a surfactant at a concentration of about 0.05 vol.-%, about 0.10 vol.-%, about 0.15 vol.-%, about 0.20 vol.-%, about 0.25 vol.-%, about 0.30 vol.-%, about 0.35 vol.-%, about 0.40 vol.-%, about 0.45 vol.-%, about 0.50 vol.-%, about 0.55 vol.-%, about 0.60 vol.-%, about 0.65 vol.-%, about 0.70 vol.-%, about 0.75 vol.-%, about 0.80 vol.-%, about 0.85 vol.-%, about 0.90 vol.-%, about 0.95 vol.-%, or about 1.0 vol.-%. In an embodiment, the buffer solution used to wash botulinum toxin molecules through the stationary phase of the fourth chromatography column contains polysorbate 20 at a concentration of about 0.20 vol.-%.

In some embodiments, the presence of free botulinum toxin molecules in the solution passing through the column is monitored by $A_{280}$. In an embodiment, the $A_{280}$ peak (indicating the presence of free botulinum toxin molecules) is collected as a single fraction to produce the third toxin-containing eluant 130.

In some embodiments, the third toxin-containing eluant 130 may be collected as it is eluted from the fourth chromatography column and is either diluted or further purified in subsequent process steps without precipitating or lyophilizing the botulinum toxin proteins. In some embodiments, the third toxin-containing eluant 130 may be stored at approximately 2-8° C. until post-purification processing. In some embodiments, the third toxin-containing eluant 130 may be diluted, filtered, and dispensed to provide a product toxin solution 134.

Dilution, Filtration & Dispensing

In some embodiments, the method 100 further comprises diluting, filtering, and dispensing 132 third toxin-containing eluant 130 to provide a product toxin solution 134. In some embodiments, third toxin-containing eluant 130 may be diluted to a final concentration using any suitable buffer solution. In some embodiments, the diluent buffer solution may be approximately identical in composition to the wash buffer used in the fourth chromatographic separation 128. For example, the diluent buffer solution may comprise an acetic acid-acetate buffer at a pH of less than about 7, preferably between about 5 and about 7, preferably between about 6 and about 7, preferably between about 6.6 and about 6.9. In some embodiments, the pH of this buffer solution is about 6.5, about 6.6, about 6.7, about 6.8, about 6.9, or about 7.0.

The method 100 may further comprise filtering the third toxin-containing eluant 130 (or its diluted form) to reduce bioburden and provide a product toxin solution 134. Filtering the third toxin-containing eluant 130 may comprise any suitable filtration technique (e.g., diafiltration, tangential flow microfiltration, tangential flow ultrafiltration, hollow fiber filtration, etc.). In some embodiments, the filter may have a pore size of between 0.1 µm and 10 µm (e.g., approximately 0.2 µm).

The product toxin solution 134 may be dispensed into containers (e.g., cryogenic vials), which may be transported and stored under conditions that preserve the potency of the botulinum toxin proteins therein. For example, product toxin solution 134 may be dispensed into, transported, and/or stored in pre-chilled storage containers (e.g., in vials contained in pre-chilled aluminum blocks).

In some embodiments, dispensing the product toxin solution 134 may comprise pumping the product toxin solution from a sterile container (e.g., a sterile single-use bag) into primary storage containers (e.g., cryogenic vials). In some embodiments, the primary storage containers may be pre-chilled and maintained at an appropriate temperature (e.g., at or below 0° C.), for example, by storing, transporting, and freezing the primary storage containers in pre-chilled aluminum blocks. This maintains the product toxin solution 134 at a temperature at which the botulinum toxin molecules are stable and retain their neurotoxicity. It may also eliminate the need for lyophilizing the product toxin solution 134. The product toxin solution 134 may additionally be stored at a temperature at or below approximately 0° C., preferably at approximately −70° C. or less.

Process Yield

The total process yield and the yield over each step may be calculated to evaluate the purification process. The yield may be calculated from the obtained toxin concentration on each fraction. The yield over each process step (i.e., "Process Step Yield") may be calculated according to the following formula:

$$\text{Process Step Yield (\%)} = \frac{(C_{fraction})(V_{fraction})}{(C_{previous\ fraction})(V_{previous\ fraction})} \times 100, \quad \text{(Equation 1)}$$

where C is toxin concentration, V is volume, the subscript fraction indicates the toxin concentration or volume from the current processing step, and the subscript previous fraction indicates the toxin concentration or volume from the previous processing step. For example, if a process step produces 1.0 µg/mL of toxin in a volume of 1000 mL, and the previous process step produced 0.5 µg/mL of toxin in a volume of 4000 mL, the process step yield would be 50%. ([1.0 µg/mL×1000 mL]/[0.5 µg/mL×4000 mL])×100=50%.)

The total yield may be calculated using the following formula:

$$\text{Total Yield (\%)} = \frac{(C_{DS})(V_{DS})}{(C_{KS})(V_{KS})} \times 100, \quad \text{(Equation 2)}$$

where C is concentration, V is volume, the subscript DS indicates drug substance (i.e., the product toxin solution), and the subscript KS indicates the culture at harvest, with cells removed by filtering through a 0.2-µm filter. For example, if the DS contained 50 µg/mL of toxin in a volume of 100 mL, and the culture at harvest contained 5 µg/mL of toxin in a volume of 5000 mL, the total yield would be 20%. ([50 µg/mL×100 mL]/[5 µg/mL×5000 mL])×100=20%.)

In some embodiments, the total yield is at least about 10%, at least about 15%, at least about 20%, at least about 25%, at least about 30%, at least about 35%, at least about 40%, or any range or value in between. In some embodiments, the total yield is about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, or about 40%, or any value in between.

In an embodiment, the purity of the drug substance may be determined from SDS-PAGE and/or from HPLC-SEC. In an embodiment, the drug substance obtained from a process according to the present disclosure has a purity of at least about 95%, at least about 96%, at least about 97%, at least about 98%, or at least about 99% (and ranges in between). In an embodiment, the drug substance may have a purity of about 96.0%, about 96.5%, about 97.0%, about 97.5%, about 98.0%, about 98.5%, about 99.0%, about 99.5%, or about 100.0%, or any value in between.

EXAMPLES

Example 1: Four-Column Chromatographic Method for Purifying Botulinum Toxin

By way of example, one embodiment of the method may be carried out according to the description below, wherein botulinum toxin A1 (~150 kDa) is recovered from a fermentation medium substantially free, essentially free, or free of animal products comprising C. botulinum cells and botulinum toxin A1 protein molecules and toxin complexes. One such APF fermentation medium has been described in the U.S. provisional patent application No. 62/951,549. The botulinum toxin therein is filtered and purified according to the process steps described in more detail below to produce a product toxin solution comprising botulinum toxin protein molecules, free, essentially free, or substantially free of toxin complexes, without the use of any precipitation or lyophilization steps.

Buffer Preparation

As shown in Table 1, multiple different buffer solutions may be used in this embodiment of the method. In an embodiment, the buffers are passed through 0.2-μm filters (to reduce bioburden) into sterile single-use bags. The used filters are disconnected, and the bags containing the buffers are stored at room temperature until usage.

buffer 7 was used to condition the toxin-containing fraction from the first chromatographic separation for the second chromatographic separation; buffer 8 was used to wash bulk impurities (e.g., proteins) through the second chromatography column; buffer 9 was used to elute bound botulinum toxin complexes from the second chromatography column; buffer 10 was used to separate the NTH and/or NTNH proteins from the botulinum toxin protein molecules (i.e., to condition the first toxin-containing eluant from the second chromatographic separation for the third chromatographic separation); buffers 11 and 12 were used to equilibrate the third chromatography column; buffer 13 was used to wash impurities off the third chromatography column; buffer 14 was used to elute the bound botulinum toxin protein molecules off the third chromatography column; buffer 15 was used to equilibrate the fourth chromatography column; buffer 16 was used to wash botulinum toxin molecules through the fourth chromatography column; and buffer 17 was used to dilute the toxin-containing eluant from the fourth chromatographic separation to its final concentration before dispensing it into primary storage containers to provide a product toxin solution.

Filtration

C. botulinum fermentation medium was obtained from an APF production process described in the U.S. provisional patent application No. 62/951,549. Directly after harvest, the culture (approximately 5 L) was diluted using approximately 280 mL of a buffer solution (1 M sodium acetate, 4 M NaCl, pH 5.5) for pH adjustment immediately prior to filtration. The diluted solution was filtered by microfiltration ("Filtration 1") using a 0.2-μm hollow fiber filter by tangential flow filtration to separate spores, as well as whole and lysed C.

TABLE 1

Buffer Solutions Used in BoNT/A1 Purification Process

Buffers Used in the BoNT/A1 Purification Process

| Column Chromatography | Buffers Used |
|---|---|
| First Chromatographic Separation<br>Q Sepharose FF | 1. 20 mM Na phosphate, 1 M NaCl, pH 6.1<br>2. 20 mM Na phosphate, 150 mM NaCl, pH 6.1<br>3. 20 mM Na phosphate, 150 mM NaCl, pH 6.1<br>4. 20 mM Na phosphate, 150 mM NaCl, pH 6.1 |
| Second Chromatographic Separation<br>SP Sepharose FF | 5. 50 mM Na acetate, 1 M NaCl, 0.2% polysorbate 20, pH 4.5<br>6. 50 mM Na acetate, 0.2% polysorbate 20, pH 4.5<br>7. 100 mM Na acetate, 0.4% polysorbate 20, pH 4.5<br>8. 50 mM Na acetate, 210 mM NaCl, 0.2% polysorbate 20, pH 4.5<br>9. 50 mM Na acetate, 270 mM NaCl, 0.2% polysorbate 20, pH 4.5 |
| Third Chromatographic Separation<br>Q Sepharose FF | 10. 20 mM tris-HCl,* 50 mM NaCl, pH 8.0<br>11. 20 mM tris-HCl, 1 M NaCl, 0.2% polysorbate 20, pH 8.0<br>12. 20 mM tris-HCl, 50 mM NaCl, 0.2% polysorbate 20, pH 8.0<br>13. 20 mM tris-HCl, 50 mM NaCl, 0.2% polysorbate 20, pH 8.0<br>14. 20 mM tris-HCl, 120 mM NaCl, 0.2% polysorbate 20, pH 8.0 |
| Fourth Chromatographic Separation<br>Superdex 200 | 15. 50 mM Na acetate, 370 mM NaCl 0.2% polysorbate 20, 13 mM Na$_2$HPO$_4$, 17 mM NaOH, pH 6.6-6.9<br>16. 50 mM Na acetate, 370 mM NaCl 0.2% polysorbate 20, 13 mM Na$_2$HPO$_4$, 17 mM NaOH, pH 6.6-6.9 |
| Post-Purification | |
| Final Dilution | 17. 50 mM Na acetate, 370 mM NaCl, 0.2% polysorbate 20, 13 mM Na$_2$HPO$_4$, 17 mM NaOH, pH 6.6-6.9 |

*Abbreviations: Tris-HCl = tris(hydroxymethyl)aminomethane hydrochloride

In Table 1, buffers 1 and 2 were used to equilibrate the first chromatography column; buffer 3 was used to condition a clarified culture for column chromatography; buffer 4 was used to wash the botulinum toxin complexes through the first column in flow-through mode; buffers 5 and 6 were used to equilibrate the second chromatography column;

botulinum cells, providing a clarified culture. The clarified culture was sampled for in-process control for absence of C. botulinum. The clarified culture was then purified by removal of fermentation medium residues (e.g., proteins, carbohydrates, etc.) by tangential flow ultrafiltration ("Filtration 2") using a 50 kDa hollow fiber filter. The clarified culture then underwent buffer exchange in a sodium phosphate buffer (pH approximately 6.1) to condition the clarified culture for column chromatography. This and other suitable protein filtration processes are known in the art. See e.g., Munir Cheryan, *Ultrafiltration and Microfiltration Handbook* (2d ed. 1998).

Purification

A four-column chromatography process was developed for purifying BoNT/A1 protein molecules (~150 kDa) without using any precipitation, lyophilization steps, or centrifugation steps. This process provides a product toxin solution that is free, essentially free, or substantially free of botulinum toxin complexes and/or animal products. This enhances yields and eliminates end user errors associated with reconstitution procedures, which are known to reduce the potency of botulinum toxin drug compositions.

The process takes advantage of the botulinum toxin complexes through the initial steps to protect the toxin while proteases and other bulk contaminating proteins are removed. The first chromatography step, which is an anion exchange chromatography, removes the majority of nucleic acids in the culture medium at harvest, that otherwise would interfere with the downstream chromatography steps. This inhibits denaturation of the botulinum toxin molecules during the purification process. The process then separates botulinum toxin protein molecules from their associated NTH and/or NTNH proteins to provide a product toxin solution that comprises pure botulinum toxin molecules (~150 kDa) and is free, essentially free, or substantially free of botulinum toxin complexes.

Additionally, all chromatography steps used in this process were designed to be conducted on single-use chromatography columns, which are disposable after one purification procedure. This eliminates costly and time-consuming column regeneration steps encountered with multiple-use chromatography systems. The entire process is carried out using a closed system, utilizing single-use bags, tubings, filters, and chromatography columns. Furthermore, open handling steps are avoided, as the process fluid is preferably maintained within bags, tubings, filters, or columns, which protects the product toxin solution from contamination and the operator from exposure to the toxin.

Table 2 summarizes the four-column chromatographic purification method for BoNT/A1 according to the present disclosure. The process includes the following steps:

(1) The clarified culture was directly injected on a Q Sepharose FF column (2.5 L packed in a column with a diameter of 80 mm and height of 500 mm) in flow-through mode using a sodium phosphate buffer (pH 6.1) to separate botulinum toxin complexes from nucleic acids. In this step, the botulinum toxin complexes did not bind to the stationary phase and instead flowed through the column in the toxin-containing fraction.

(2) The toxin-containing fraction from the Q Sepharose FF column (100 mL packed in a column with a diameter of 50 mm and height of 50 mm) was conditioned in a sodium acetate buffer (pH 4.5) and passed through a SP Sepharose FF column using a sodium acetate buffer (pH 4.5). In this step, the botulinum toxin complexes adsorbed to the stationary phase while bulk impurities (e.g., other proteins) were washed through the column. The toxin complexes bound to the column were eluted using a sodium acetate buffer (pH 4.5) containing NaCl and were collected in the first toxin-containing eluant.

(3) The first toxin-containing eluant was filtered to remove fermentation medium residues and conditioned in a suitable buffer solution by tangential flow ultrafiltration ("Filtration 3") for buffer exchange (tris-HCl buffer, pH 8.0) using a 30 kDa filter to dissociate the botulinum toxin molecules from the NTH and/or NTNH proteins in the toxin complexes. The retentate was then passed through a Q Sepharose FF column (2 mL packed in a column with a diameter of 5 mm and height of 100 mm) to separate the free botulinum toxin proteins from the NTH and/or NTNH proteins. In this step, the botulinum toxin molecules adsorbed to the stationary phase while the NTH and/or NTNH proteins (and other bulk impurities) were to some extent washed through the column (but were mainly adsorbed even more strongly to the stationary phase than were the botulinum toxin molecules). The botulinum toxin proteins were eluted using a tris-HCl buffer (pH 8.0) containing NaCl and collected in the second toxin-containing eluant.

(4) The second toxin-containing eluant was directly injected on a Superdex 200 gel filtration column (320 mL packed in a column with a diameter of 25 mm and height of 600 mm) for final polishing (i.e., removal of aggregates). In this step, the column was washed with a buffer containing 50 mM Na acetate, 370 mM NaCl, 0.2% polysorbate 20, 13 mM $Na_2HPO_4$, and 17 mM NaOH (pH 6.6-6.9), and the purified botulinum toxin proteins were collected in the third toxin-containing eluant.

TABLE 2

Summary of Column Chromatography Steps in BoNT/A1 Purification Process

Summary of Column Chromatography Steps

| Column | Technique | Stationary Phase | Purpose |
|---|---|---|---|
| 1 | AIEX | Q Sepharose FF | Toxin in flow-through; nucleic acids bind to column |
| 2 | CIEX | SP Sepharose FF | Separation of bulk impurities (e.g., proteins) |
| 3 | AEIX | Q Sepharose FF | Purification from complex proteins (i.e., NTH and NTNH) |
| 4 | Gel Filtration | Superdex 200 | Final polishing; removal of aggregates; buffer exchange |

Each of the column chromatography steps discussed above may involve clean-in-place procedures and other column preparation steps prior to carrying out chromatographic separations. Column preparation and operation procedures are well known in the art. See generally, e.g., Ozutsumi et al., 49 APPL. ENVTL. MICROBIOL. 939 (1985); GE Healthcare, *Strategies for Protein Purification Handbook* (2010); Schmidt et al., 156 ANAL. BIOCHEM. 213 (1986); Simpson et al., 165 METHODS ENZYMOL. 76 (1988); Zhou et al., 34 BIOCHEM. 15175 (1995); Kannan et al., 15 MOV. DISORD. 20

(2000); Wang Y c, DERMATOL. LAS FACIAL COSMET. SURG. 58 (2002); Johnson et al., 32 PROTEIN EXPR. & PURIF. 1 (2003); US 2003/0008367 A1.

Dilution/Filtration/Dispensing

The purified botulinum toxin proteins were diluted to their final concentration in a suitable buffer solution (e.g., 50 mM sodium acetate, 0.2% polysorbate 20, 370 mM NaCl, 13 mM sodium phosphate, 17 mM NaOH) and gently mixed on a platform rocker for about 30 minutes. The diluted product was filtered using a 0.2 µm filter into a sterile-single use bag and dispensed in 0.4 mL aliquots into 1.8-mL cryogenic vials using a dispensing pump and a needle. The samples were then quickly frozen using pre-chilled aluminum blocks stored at <−70° C. The final solutions prepared for storage according to the method are herein below referred to as the "drug substance" (or "DS").

Three different drug substance lots were prepared according to the steps outlined above: #16852, #17043, and #19139. The DS lots were then tested for appearance, potency, specific activity, and total protein concentration, as discussed in the following Examples.

Example 2: Appearance Testing

Clarity and color are tested to verify that the drug substance is transparent and free of color, as opalescence in the solution can indicate aggregation or precipitation of protein. The method is a visual method, based on Ph. Eur. 2.2.1, titled "Clarity and Degree of Opalescence of Liquids," and Ph. Eur. 2.2.2, titled "Degree of Coloration of Liquids," but with the modification that the vial and volume for the drug substance is used, instead of the container and volume specified in the Pharmacopeia methods. Water is used as reference solution.

By this method, the drug substance lots prepared according to Example 1 were all clear and colorless solutions, indicating no detectable aggregation or precipitation of botulinum toxin protein molecules.

Example 3: Potency

The potency of the purified drug substance obtained from Example 1 was determined using a mouse $LD_{50}$ assay. This is an absolute assay that quantitatively measures the potency within the sample tested. A gelatin-phosphate buffer is used as the diluent, and 11 dose groups centered around a target $LD_{50}$ value are established. The dose groups, with potencies between 3.0-0.4 units per dose, are equally spaced at approximately 0.0899 log intervals. The number of mortalities 72 h after injection is recorded and the $LD_{50}$ is calculated, using the Spearman-Karber method. The Spearman-Karber calculation is used as a mathematical means to determine the mid-point ($LD_{50}$) of the log dilution curve with respect to death. The potency of the purified drug substance is expressed as $LD_{50}$ units/mL. See, e.g., M. A. Ramakrishnan, *Determination of 50% Endpoint Titer Using a Simple Formula*, 5 WORLD J. VIROL. 85-86 (2016); see also G. Kärber, 162 PATHOL. U PHARMAKOL. 480-83 (131); C. Spearman, *The Method of "Right and Wrong Cases" (Constant Stimuli) Without Gauss's Formula*, 2 BR. J. PSYCHOL. 227-42 (1908).

Purified drug substance lots #16852, #17043, and #19139 showed potency values of $11 \times 10^6$ $LD_{50}$ units/mL, $23 \times 10^6$ $LD_{50}$ units/mL, and $19 \times 10^6$ $LD_{50}$ units/mL, respectively. These potency values, in combination with the volume of DS produced, confirm that the process yield is sufficient for a high number of drug product doses to be produced from a DS lot, which is desirable for a commercial DS production.

Example 4: Total Protein Concentration

Total protein concentration for the drug substance prepared according to Example 1 was determined according to the bicinchoninic acid (BCA) method because it has high enough sensitivity to determine the protein concentration in a typical drug substance lot prepared according to Example 1. See Ph. Eur. 2.5.33 method 4; see also USP <507> method II.

The Micro BCA Protein Assay Kit is used to determine the total protein concentration, and a standard curve using Bovine Serum Albumin is used to calculate the concentration of protein from the measured absorbance. The result is reported as the mean value of duplicate sample measurements.

For purified drug substance lots #16852, #17043, and #19139, the total protein concentration was determined to be 59.4 µg/mL, 107.0 µg/mL, and 91.4 µg/mL, respectively. These protein concentration values obtained for the DS lots are high enough to ensure that analytical methods for release and characterization are precise and accurate.

Example 5: Specific Activity

For drug substance produced according to Example 1, the specific activity is calculated from the potency value for the drug substance, in units/mL, obtained by the $LD_{50}$ assay (Example 3) and the total protein concentration (Example 4) for the drug substance, in mg/mL. The specific activity is calculated according to the formula:

$$\text{Specific Activity} \left(\frac{U}{mg}\right) = \frac{\text{Potency} \left(\frac{U}{mL}\right)}{\text{Total Protein Concentration} \left(\frac{mg}{mL}\right)} \quad \text{(Equation 3)}$$

For purified drug substance lots #16852, #17043, and #19139, the specific activity was determined to be $1.9 \times 10^8$ U/mg, $2.2 \times 10^8$ U/mg, and $2.1 \times 10^8$ U/mg, respectively. This confirms a high degree of purity for the DS, which shows that the process is suitable for commercial production of a highly purified and fully active complex-free botulinum toxin.

Example 6: Protein-Related Impurities

The method used for determination of protein-related impurities in the drug substance prepared according to Example 1 is based on the principles described in Ph. Eur. 2.2.31 Electrophoresis, titled "Sodium Dodecyl Sulfate Polyacrylamide Gel Electrophoresis (SDS-PAGE)—Uniform Percentage Gels." In this method, SDS-PAGE in combination with Colloidal Coomassie Blue staining is used. A standard curve is prepared by diluting the sample; both non-reduced and reduced samples are analyzed. Impurities are quantified using densitometry by relating the band intensity of the impurity band to the standard curve. Impurity results are expressed in percentage of the total protein amount loaded on the gel.

Figure 2:
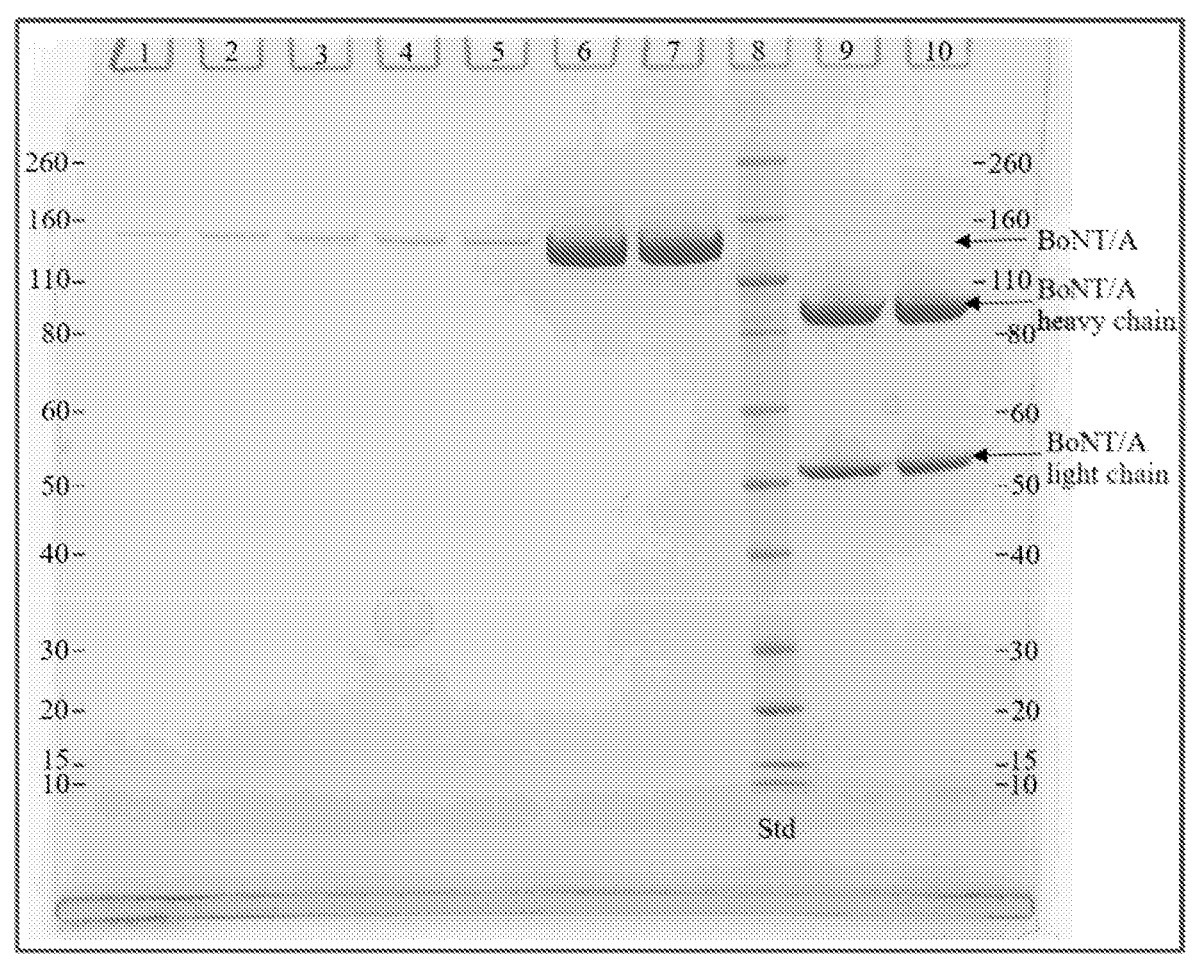

FIG. 2 shows results from analysis of the purity of DS lot #17043 prepared according to Example 1, obtained using SDS-PAGE and Colloidal Coomassie Blue staining. The lanes from left to right are: 1-5: non-reduced samples of standard curve (1.2-4.0 µg/mL) from lot #17043; 6-7: non-reduced lot #17043 replicate 1 and 2 (140 µg/mL); 8: molecular weight marker; and 9-10: reduced lot #17043 replicate 1 and 2 (140 µg/mL). For all three drug substance lots prepared according to Example 1, the protein-related impurities were <6.0%, and lot #16852 in particular showed no detectable impurities.

Example 7: Residual Nucleic Acids

A limit test for residual nucleic acid was performed to detect RNA and/or DNA in the drug substance prepared according to Example 1. The method uses a commercially available RiboGreen RNA quantitation Kit. RiboGreen binds nucleic acid, generating a fluorescence signal proportional to the amount of nucleic acid in the sample. Since DNA generates a higher signal than RNA when binding RiboGreen, the nucleic acid contents of DNA containing samples will be overestimated by using standards containing RNA, leading to the reported nucleic acid values being the maximum amount of nucleic acid in the samples.

Purified drug substance lots #16852, #17043, and #19139 were compared to a reference standard curve with the lowest standard sample at 0.15 µg/mL RNA. All three lots showed sample fluorescence lower than the standard, corresponding to ≤0.15 µg/mL of residual nucleic acids (data not shown).

Example 8: Protein Profile

The method used for the determination of protein profile is based on the principles described in Ph. Eur. 2.2.31 Electrophoresis, titled "Sodium Dodecyl Sulfate Polyacrylamide Gel Electrophoresis (SDS-PAGE)—Uniform Percentage Gels." Purified drug substance lots #16852, #17043, and #19139 were analyzed on a 4-12% Bis-Tris gel to separate the constituent proteins and were stained using silver staining (SilverQuest staining kit). FIG. 3 shows SDS-PAGE results for reduced (lanes 6-9) and non-reduced (lanes 2-5) drug substance samples, compared to molecular weight markers (1 and 10). Lanes 3 and 7 correspond to lot #16852; lanes 4 and 8 correspond to lot #17043; and lanes 5 and 9 correspond to lot #19139. (Lanes 2 and 6 show results for a drug substance lot (#1014997) prepared according to a four-column chromatography process using slightly different process parameters (e.g., a slightly higher pH for the buffers in first chromatographic separation)).

Purified drug substance lots #1014997, #16852, #17043, and #19139 show comparable protein profiles with an intense band around 150 kDa (lanes 2, 3, 4, and 5, respectively), indicating the primary protein component is free BoNT/A. Reduced samples in lanes 6, 7, 8, and 9 show two main protein components at around 100 kDa and 150 kDa, corresponding to the heavy chain and light chain of BoNT/A, respectively.

Example 9: Molecular Weight Distribution of Drug Substance

The molecular weight size distribution of the drug substance components was monitored using size exclusion chromatography (SEC). The method analyzes the main components in the sample including the product toxin and any high- and low-molecular-weight species (HMW and LMW, respectively) that may be either process- or product-related. An UPLC® SEC Column is used for the separation. The mobile phase is buffer 17 (Table 1 above), supplemented with 0.4 M L-arginine, and the pH is between 6.6-6.9. The L-arginine is added to the buffer 17 to minimize secondary interactions between the separated proteins and the column matrix, filters, and other wetted parts of the chromatographic system. Using a flow rate of 0.25 mL/min, duplicate samples (from one vial of drug substance) are analyzed without any pretreatment or dilution. Detection is at 280 nm. The resulting chromatograms are integrated, and the obtained mean area percentages (area %) for the main component are reported for each drug substance lot.

Figure 4:
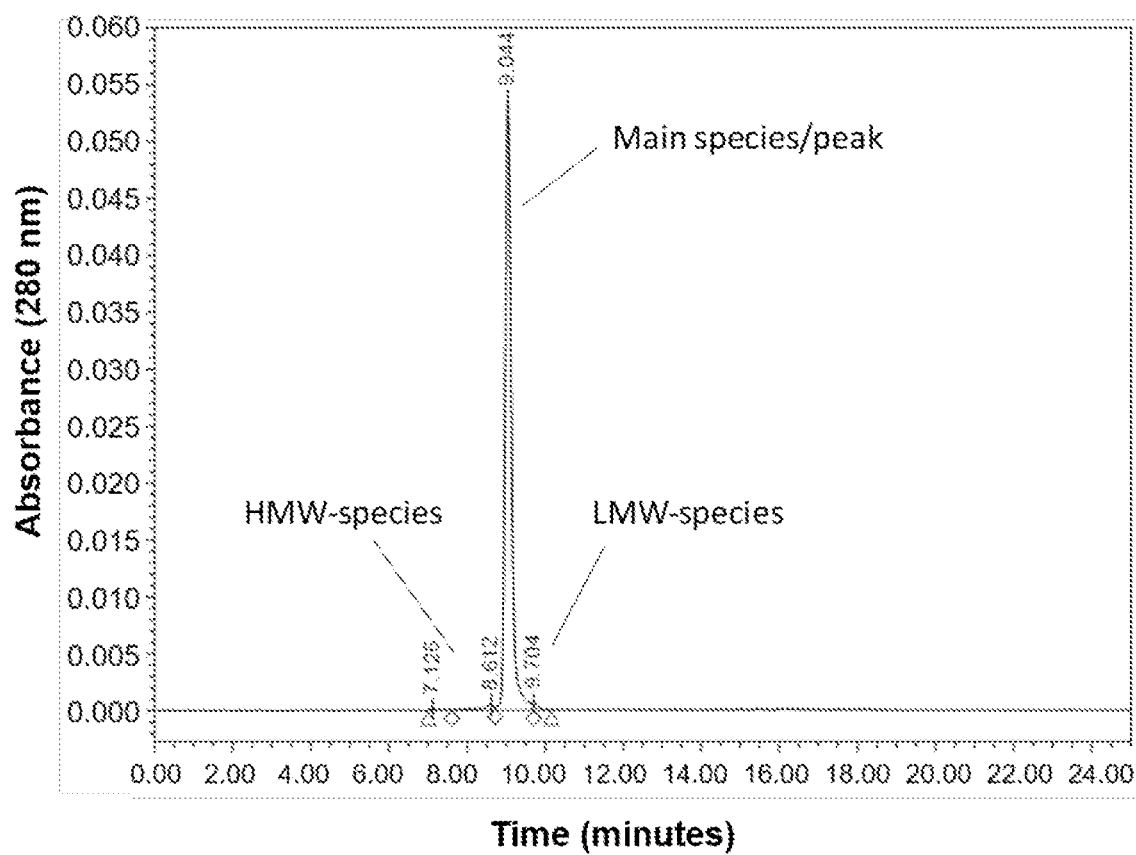
FIG. 4 shows SEC molecular weight distribution results for a product toxin solution prepared according to the present disclosure.

FIG. 4 shows the molecular weight distribution for DS lot #17043, which was prepared according to Example 1. The main peak corresponds to free product toxin molecules. Purified drug substance lots #16852, #17043, and #19139 all showed at least 96% of the main component (BoNT/A). This data confirms the high level of purity of the botulinum toxin in the product toxin solutions prepared according to the present disclosure.

Example 10: Process Step Yield

The process step yield of BoNT/A is determined as an indicator of the robustness of each step in the purification process. In order to calculate the process step yield, each fraction is weighed to determine the volume. To determine the concentration of BoNT/A in each fraction, a BoNT/A-specific ELISA is used.

The ELISA protocol is an indirect sandwich ELISA based on the principles and general method described in USP <1103>, "Immunological Test Methods—Enzyme-linked Immunosorbent Assay." The ELISA method is based on immunological binding and detection of BoNT/A using two different types of BoNT/A-specific polyclonal antibodies.

A series of protein standard dilutions based on a commercial BoNT/A toxin, is prepared by diluting BoNT/A in PBS-Tween solution (0.05% Tween-20), to the concentration range of 3-28 ng/mL. A sample diluted in PBS-Tween to the range of the protein standard dilutions, is added in triplicate to microplate wells coated with polyclonal anti-BoNT/A antibody. Incubation results in antibody recognition and binding of BoNT/A antigen to the well. Each incubation is followed by an automated washing step using PBS-Tween solution.

Primary detection is carried out by binding another type of polyclonal anti-BoNT/A antibody, leading to formation of the sandwich complex. A secondary antibody conjugated to horseradish peroxidase (HRP) is then added. Its binding to the primary antibody allows for detection of BoNT/A within the sandwich complex. 3,3',5,5'-tetramethylbenzidine (TMB) substrate is then added to the sample wells. HRP converts TMB substrate to produce a blue reaction product. A stop solution is added, halting the TMB conversion and initiating a color conversion of remaining TMB to yellow. Absorbance in each microplate well is detected at 450 nm with a plate reader, with the measured absorbance being directly proportional to the amount of BoNT/A in the well. The sample absorbance values are calculated by comparison against a standard curve based on absorbance values from the BoNT/A standard dilutions. The results are reported as mean values, in µg/mL. The process step yield is then calculated according to Equation 1 above.

Figure 5:
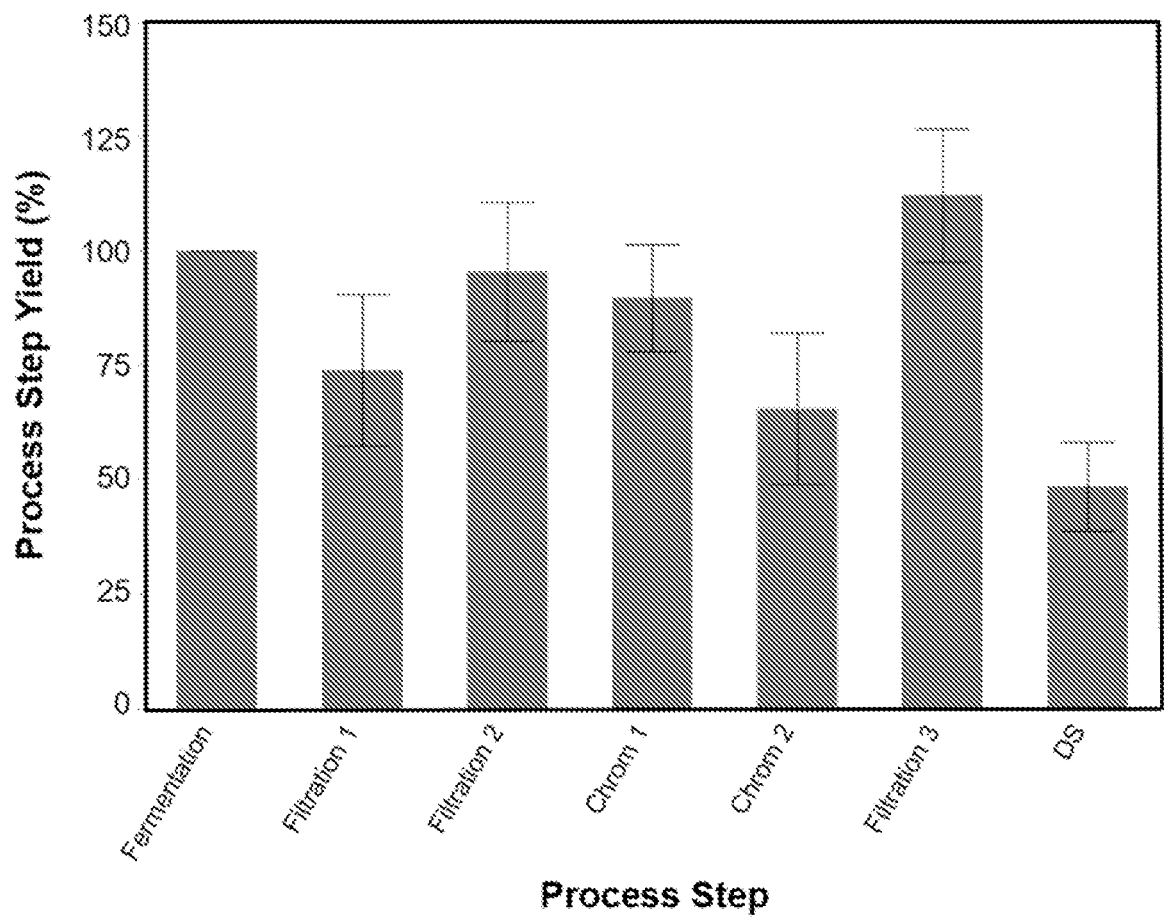
FIG. 5 shows the average process yield over successive purification steps for three product toxin solutions prepared according to the present disclosure.

FIG. 5 shows the mean values for the process step yield at each step in the purification process for lots #16852, #17043, and #19139. The bar labeled "DS" shows the combined yield over the final two chromatography steps, as they are interconnected, and no sampling is performed between them. The data show that the yield for the process steps varies between around 100% to 50%.

Example 11: Accumulated Process Step Yield

The accumulated process step yield for each individual process step is calculated by the formula:

$$\text{Accumulated Process Step Yield (\%)} = \frac{(C_{fraction})(V_{fraction})}{(C_{KS})(V_{KS})} \times 100 \quad \text{(Equation 4)}$$

where C is toxin concentration, V is volume, the subscript fraction indicates the toxin concentration or volume from the current processing step, and the subscript KS indicates the culture at harvest, with cells removed by filtering through a 0.2-µm filter. The accumulated process step yield for culture at harvest (KS) is set as 100%.

Figure 6:
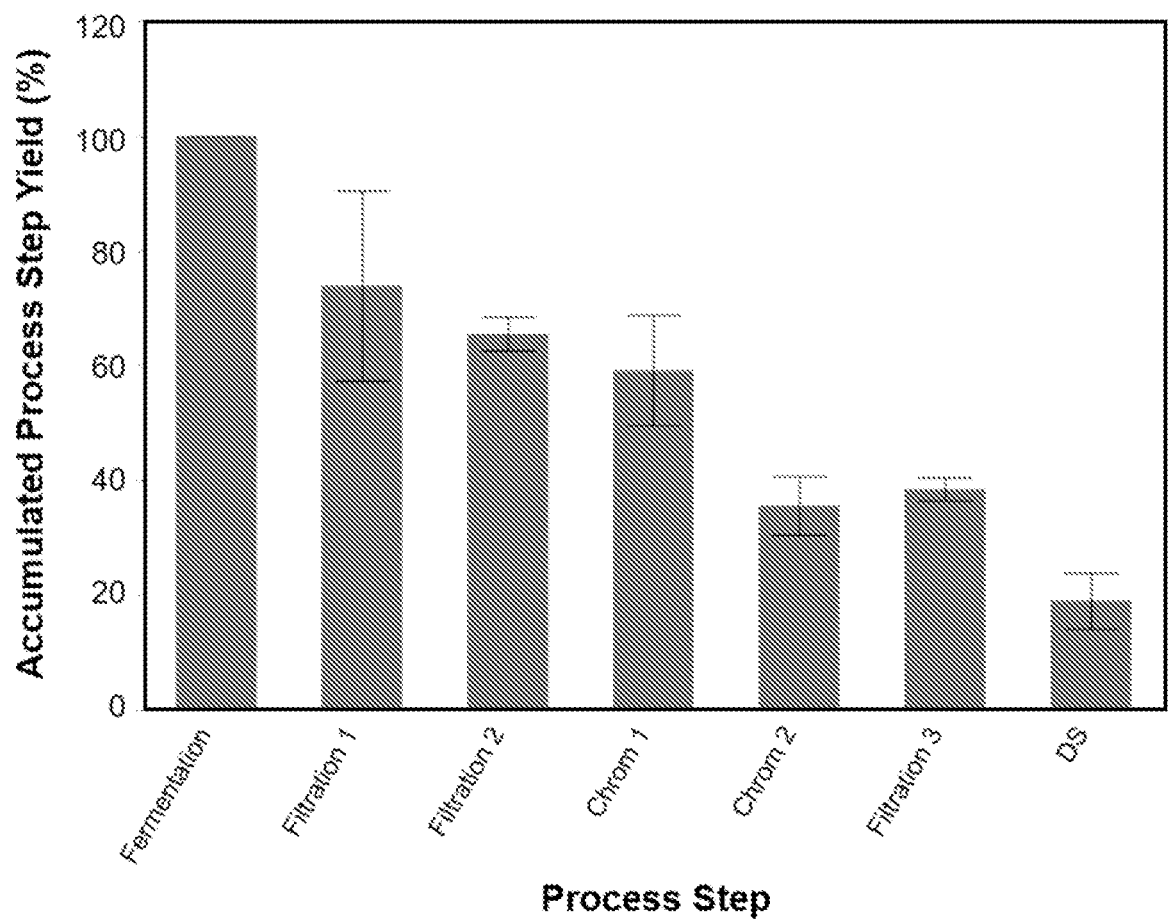
FIG. 6 shows the average accumulated process yield over successive purification steps for three product toxin solutions prepared according to the present disclosure.

FIG. 6 shows the mean accumulated process step yield for each step in the purification process for purified drug substance lots #16852, #17043, and #19139. The bar labeled "DS" shows the combined yield over the two last chromatography steps, as they are interconnected and no sampling is performed between them.

Example 12: Total Yield

The total yield of BoNT/A in the product toxin solution (or "DS") compared to the culture at harvest ("KS") is determined as an indicator of the robustness of the overall purification process. To calculate the process yield, the KS and DS fractions are weighed to determine the volumes. The concentration of BoNT/A in KS and DS is determined using a BoNT/A-specific ELISA. The total yield is calculated according to Equation 2 above.

For purified drug substance lots #16852, #17043, and #19139, the total yields were determined to be between 13% and 29% (data not shown).

Example 13: Purity Improvement Factor (Over Steps)

The purity improvement factor of BoNT/A over each individual process step is determined as an indicator of the efficiency of each step (and the purification process as a whole) to remove unwanted protein components (process- and product-related). To calculate the purity improvement factor over steps, each fraction is analyzed for toxin concentration using a BoNT/A-specific ELISA and for total protein concentration by the Micro BCA method (Example 4). The purity improvement over steps is calculated according to the formula:

$$\text{Purity Improvement Factor Over Step (fold)} = \frac{\frac{(ToxC_{fraction})}{(TotPC_{fraction})}}{\frac{(ToxC_{previous\ fraction})}{(TotPC_{previous\ fraction})}} \quad \text{(Equation 5)}$$

where ToxC is toxin concentration, TotPC is total protein concentration, the subscript fraction indicates the toxin concentration or total protein concentration from the current processing step, and the subscript previous fraction indicates the toxin concentration or total protein concentration from the previous processing step.

Figure 7:
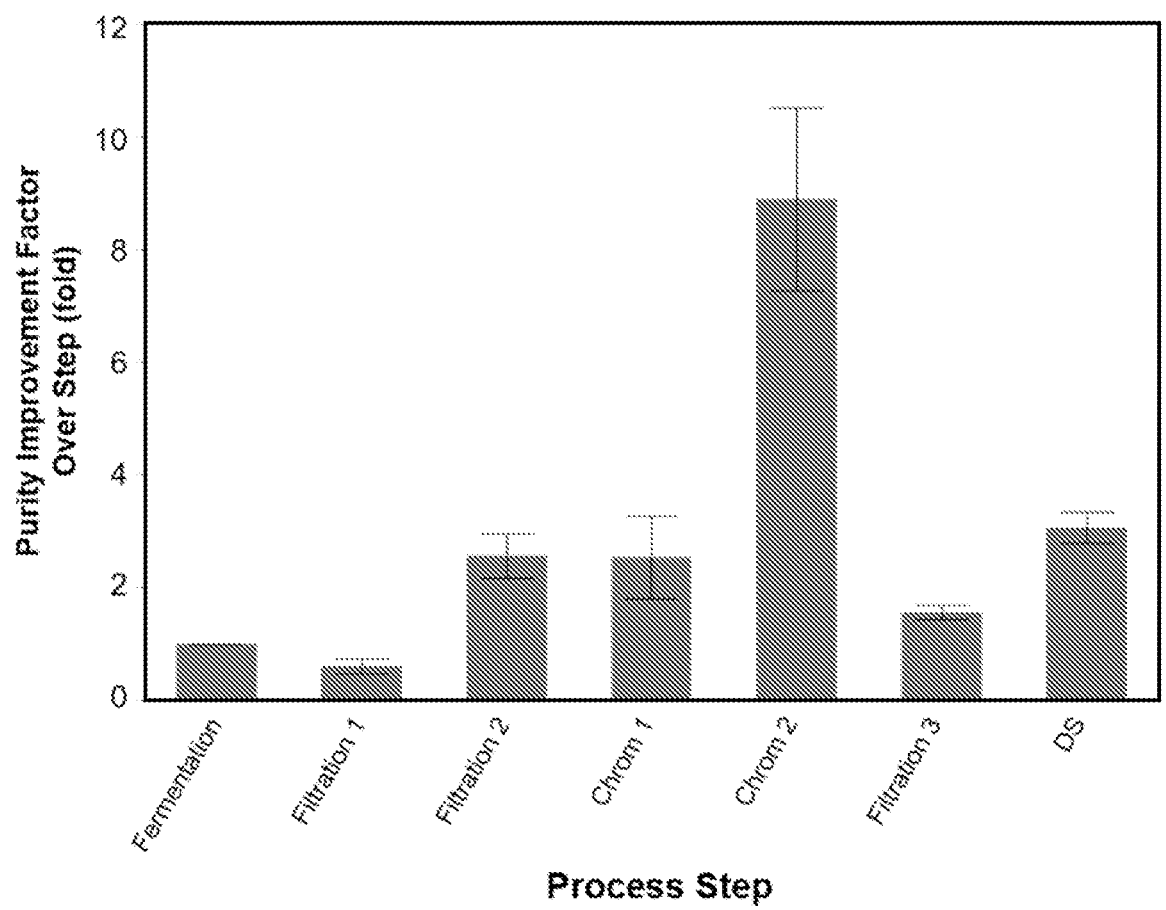
FIG. 7 shows the average purity improvement factor over successive purification steps for three product toxin solutions prepared according to the present disclosure.

FIG. 7 shows the mean values for the purity improvement factor over steps for purified drug substance lots #16852, #17043, and #19139. The bar labeled "DS" shows the combined purity improvement factor over the two last chromatography steps, as they are interconnected and no sampling is performed between them. From the data, it is clear that the second chromatography column is the step that contributes the most to the purification of the toxin. However, all steps (apart from Filtration 1, which removes whole or lysed cells and cellular components) contribute to the overall purification of the toxin relative to total protein concentration.

Example 14: Accumulated Purity Improvement Factor (Over Steps)

The accumulated purity improvement factor is calculated for each individual process step as follows:

$$\text{Accumulated Purity Improvement Factor Over Step (fold)} = \frac{\frac{(ToxC_{fraction})}{(TotPC_{fraction})}}{\frac{(ToxC_{KS})}{(TotPC_{KS})}} \quad \text{(Equation 6)}$$

where ToxC is toxin concentration, TotPC is total protein concentration, the subscript fraction indicates the toxin concentration or total protein concentration from the current processing step, and the subscript KS indicates the toxin concentration or total protein concentration from the culture at harvest, with cells removed by filtering through a 0.2-µm filter. The first process step of the purification process (fermentation at harvest) is set as purity improvement factor 1.

Figure 8:
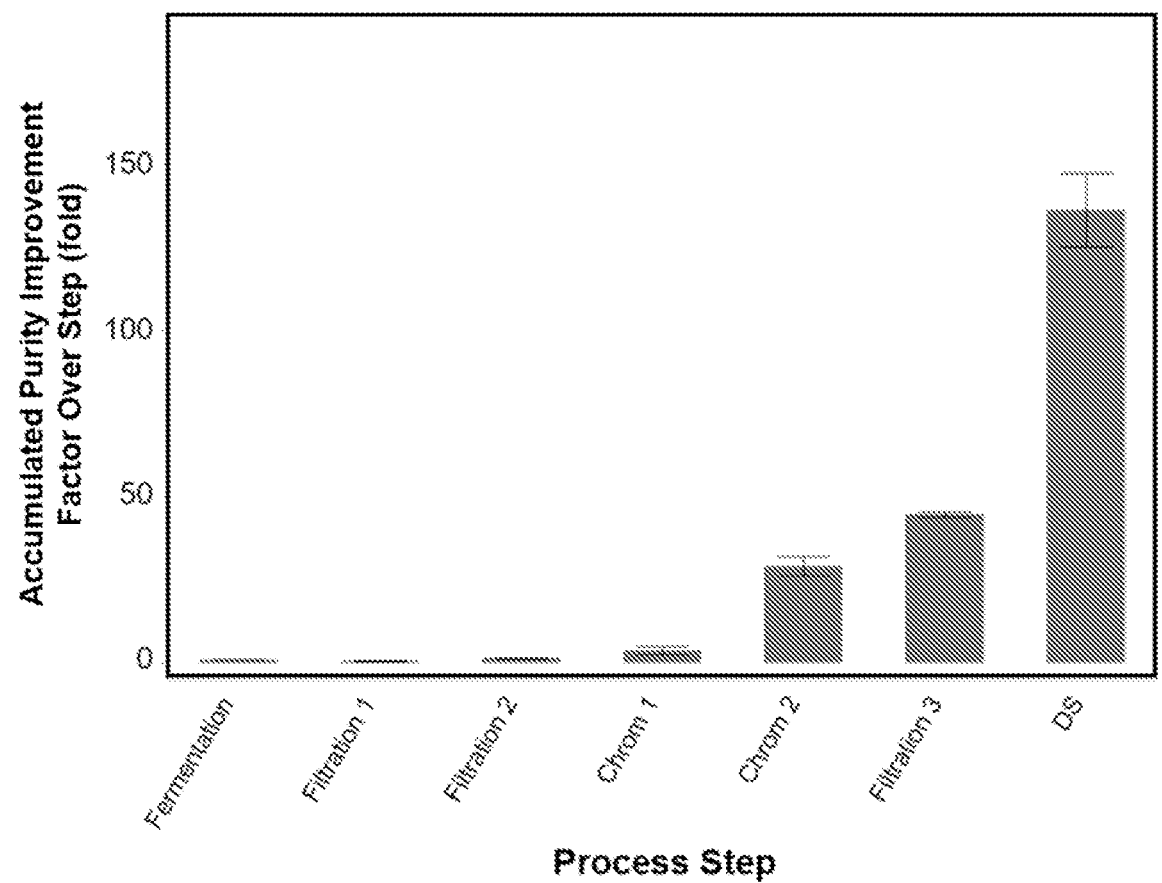
FIG. 8 shows the average accumulated purity improvement factor over successive purification steps for three product toxin solutions prepared according to the present disclosure.

FIG. 8 shows the average accumulated purity improvement factor over steps, for purified drug substance lots #16852, #17043, and #19139. The bar labeled "DS" shows the combined accumulated purity improvement factor over the two last chromatography steps, as they are interconnected and no sampling is performed between them.

What is claimed is:

1. A method for purifying a botulinum toxin from a solution comprising the toxin, comprising:
   (a) filtering the solution comprising the toxin, wherein the toxin comprises botulinum neurotoxin serotype A;
   (b) contacting a first chromatography column with the filtered solution comprising the toxin from (a) at a pH of 5.5 to 7, wherein the first chromatography column is an anion exchange chromatography column comprising an agarose bead-based medium;
   (c) collecting a toxin-containing fraction, wherein the toxin-containing fraction flows through the first chromatography column without adsorbing to a stationary phase of the first chromatography column;
   (d) contacting a second chromatography column with the toxin-containing fraction from (c) at a pH of 4 to 5, wherein the second chromatography column is a cation exchange chromatography column comprising an agarose bead-based medium;

(e) eluting the botulinum toxin from the second chromatography column to produce a first toxin-containing eluant;
(f) filtering the first toxin-containing eluant to produce a toxin-containing retentate;
(g) contacting a third chromatography column with the toxin-containing retentate from the filtering (f) at a pH of 7.5 to 8.5, wherein the third chromatography column is an anion exchange chromatography column comprising an agarose bead-based medium;
(h) eluting the botulinum toxin from the third chromatography column to produce a second toxin-containing eluant;
(i) contacting a fourth chromatography column with the second toxin-containing eluant at a pH of 6 to 7, wherein the fourth chromatography column is a gel filtration column comprising an agarose bead-based medium; and
(j) eluting the botulinum toxin from the fourth chromatography column, thereby producing a purified botulinum toxin,
wherein the method does not comprise precipitating, centrifuging or lyophilizing the botulinum toxin.

2. The method of claim 1, wherein the purified botulinum toxin is substantially free of botulinum toxin complexes.

3. The method of claim 1, wherein the purified botulinum toxin is substantially free of animal products.

4. The method of claim 1, wherein the purified botulinum toxin is substantially free of human albumin.

5. The method of claim 1, wherein the second toxin-containing eluant is directly injected onto the fourth chromatography column.

6. The method of claim 1, wherein the third chromatography column and the fourth chromatography column are interconnected.

7. The method of claim 1, wherein the first, second, third, and fourth chromatography columns are single-use chromatography systems.

8. The method of claim 1, wherein the filtering (f) dissociates botulinum toxin protein molecules from non-toxin proteins to produce free toxin molecules.

9. The method of claim 1, wherein the filtering (f) comprises a buffer exchange.

10. The method of claim 1, wherein the solution comprising the toxin is an animal product free, essentially animal product free, or substantially animal product free fermentation medium.

11. The method of claim 1, wherein the contacting (b) is performed at a pH of 6.1.

12. The method of claim 1, wherein the contacting (d) is performed at a pH of 4.5.

13. The method of claim 1, wherein the contacting (g) is performed at a pH of 8.0.

14. The method of claim 1, wherein the contacting (i) is performed at a pH of 6.6 to 6.9.

* * * * *